United States Patent
Gheorghiu et al.

(10) Patent No.: US 10,172,177 B2
(45) Date of Patent: Jan. 1, 2019

(54) UE INITIATED SCELL CONNECTION ESTABLISHMENT

(71) Applicant: QUALCOMM Incorporated, San Diego, CA (US)

(72) Inventors: Valentin Alexandru Gheorghiu, Tokyo (JP); Masato Kitazoe, Tokyo (JP); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 14/251,152

(22) Filed: Apr. 11, 2014

(65) Prior Publication Data

US 2014/0307623 A1 Oct. 16, 2014

Related U.S. Application Data

(60) Provisional application No. 61/812,582, filed on Apr. 16, 2013.

(51) Int. Cl.
  *H04W 76/16* (2018.01)
  *H04W 48/18* (2009.01)
  (Continued)

(52) U.S. Cl.
  CPC ........... *H04W 76/16* (2018.02); *H04W 48/18* (2013.01); *H04W 84/045* (2013.01); *H04W 88/06* (2013.01)

(58) Field of Classification Search
  CPC .... H04W 76/026; H04W 48/18; H04W 76/16
  See application file for complete search history.

(56) References Cited

U.S. PATENT DOCUMENTS

2006/0246917 A1* 11/2006 Jin .................. H04W 16/02
  455/450
2008/0130588 A1* 6/2008 Jeong ............... H04W 74/002
  370/335
(Continued)

FOREIGN PATENT DOCUMENTS

WO WO-2007021951 A2 2/2007
WO WO-2012074878 A2 6/2012
(Continued)

OTHER PUBLICATIONS

Genebeck Hahn, "Method of UE Multi-Connectivity Support in Macro-Small Cell Deployment", Nov. 20, 2013, Provisional Application for United States Patent.*
(Continued)

*Primary Examiner* — Brandon M Renner
*Assistant Examiner* — Jay L Vogel
(74) *Attorney, Agent, or Firm* — Holland & Hart LLP

(57) ABSTRACT

Methods, systems, devices, and apparatuses are described for wireless communications in which a wireless device may identify a small cell (e.g., SCell) and establish an independent connection with the small cell based at least in part on selection parameters received from a macro cell (e.g., PCell). The selection parameters may include power and/or quality parameters, as wells as a set of candidate cells from which to make the selection. The macro and small cells may be in communication with each other but need not be associated with the same base station (i.e., are not collocated). Once the small cell connection is established, the device may communicate with both cells concurrently. Available uplink data and/or downlink data may trigger the need for the device to connect with the small cell. For example, the small cell connection may be used to commu-
(Continued)

nicate uplink/downlink data associated with certain quality-of-service (QoS) and/or bearer identifier.

27 Claims, 21 Drawing Sheets

(51) Int. Cl.
*H04W 84/04* (2009.01)
*H04W 88/06* (2009.01)

(56) References Cited

U.S. PATENT DOCUMENTS

| | | | | |
|---|---|---|---|---|
| 2010/0130219 A1* | 5/2010 | Cave | ............... | H04W 72/02 |
| | | | | 455/450 |
| 2011/0244847 A1* | 10/2011 | Mallik | ............... | H04B 7/024 |
| | | | | 455/422.1 |
| 2012/0250578 A1* | 10/2012 | Pani | ............... | H04W 48/12 |
| | | | | 370/254 |
| 2013/0039339 A1* | 2/2013 | Rayavarapu | ...... | H04W 76/028 |
| | | | | 370/331 |
| 2013/0208601 A1* | 8/2013 | Cui | ............... | H04W 24/10 |
| | | | | 370/252 |
| 2013/0225169 A1* | 8/2013 | Farnsworth | ...... | H04W 60/04 |
| | | | | 455/436 |
| 2013/0294314 A1* | 11/2013 | Lee | ............... | H04W 48/18 |
| | | | | 370/311 |
| 2014/0079026 A1* | 3/2014 | Dimou | ............... | H04W 36/20 |
| | | | | 370/332 |
| 2014/0135018 A1* | 5/2014 | Hedberg | ...... | H04W 48/20 |
| | | | | 455/437 |
| 2014/0293776 A1* | 10/2014 | Yang | ............... | H04W 28/08 |
| | | | | 370/229 |
| 2014/0301308 A1* | 10/2014 | Hahn | ............... | H04W 76/021 |
| | | | | 370/329 |

FOREIGN PATENT DOCUMENTS

| | | |
|---|---|---|
| WO | WO-2012096457 A2 | 7/2012 |
| WO | WO-2012154100 A1 | 11/2012 |

OTHER PUBLICATIONS

ISA/EPO, International Search Report and Written Opinion of the International Searching Authority, Int'l. App. No. PCT/US2014/033979, dated Nov. 21, 2014, European Patent Office, Rijswijk, NL, 11 pgs.

* cited by examiner

UE INITIATED SCELL CONNECTION ESTABLISHMENT

CROSS REFERENCES

The present application for patent claims priority to U.S. Provisional Patent Application No. 61/812,582 by Gheorghiu et al., entitled "UE Initiated SCell Connection Establishment," filed Apr. 16, 2013, assigned to the assignee hereof, and expressly incorporated by reference herein.

BACKGROUND

The following relates generally to wireless communications. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations (e.g., eNBs), each simultaneously supporting communication for multiple wireless devices (e.g., user equipment or UE). The base stations may communicate with wireless devices on downstream and upstream links. Each base station has a coverage range, which may be referred to as the coverage area of the cell.

In some cases, a wireless device may need to communicate with multiple cells or cell layers that are not collocated (i.e., each cell is associated with a different base station). For example, the wireless device may be in communication with a macro cell (e.g., PCell) and may also need to communicate with a small cell (e.g., SCell). The connection between the wireless device and the small cell, however, may not occur fast enough to avoid communication bottlenecks.

SUMMARY

Methods, systems, and apparatuses are described for wireless communications by a wireless device. In one embodiment, selection parameters may be received from a first cell. The wireless device may use the selection parameters to identify and select a second cell. As a result, the identification and selection of the second cell may be based at least in part on the selection parameters received from the first cell. The first cell may be associated with a first base station and the second cell may be associated with a second base station. In one configuration, the first and second cells may be in communication with each other. The wireless device may establish an independent connection with the identified and selected second cell. Further, the wireless device may communicate with the first and second cells concurrently. In some cases, a radio access technology (RAT) of the second cell is different from a RAT of the first cell. In one example, the first cell corresponds to a macro cell, and the second cell corresponds to a small cell.

In some embodiments, a method for wireless communications by a wireless device includes: receiving selection parameters from a first cell; identifying and selecting a second cell based at least in part on the selection parameters received from the first cell, the first cell being associated with a first base station and the second cell being associated with a second base station, and the first and second cells being in communication with each other; establishing an independent connection with the second cell; and communicating with the first and second cells concurrently.

In some embodiments, a device for wireless communications includes a processor and a memory in electronic communication with the processor. The memory may embody instructions executable by the processor to: receive selection parameters from a first cell; identify and select a second cell based at least in part on the selection parameters received from the first cell, the first cell being associated with a first base station and the second cell being associated with a second base station, and the first and second cells being in communication with each other; establish an independent connection with the second cell; and communicate with the first and second cells concurrently.

In some embodiments, an apparatus for wireless communications includes: means for receiving selection parameters from a first cell; means for identifying and selecting a second cell based at least in part on the selection parameters received from the first cell, the first cell being associated with a first base station and the second cell being associated with a second base station, and the first and second cells being in communication with each other; means for establishing an independent connection with the second cell; and means for communicating with the first and second cells concurrently.

In some embodiments, a computer program product for wireless communications includes a non-transitory computer-readable medium storing instructions executable by a processor to: receive selection parameters from a first cell; identify and select a second cell based at least in part on the selection parameters received from the first cell, the first cell being associated with a first base station and the second cell being associated with a second base station, and the first and second cells being in communication with each other; establish an independent connection with the second cell; and communicate with the first and second cells concurrently.

In various embodiments of the methods, devices, apparatuses, and/or computer program products described above, receiving the selection parameters from the first cell may include receiving a set of candidate cells from which to select the second cell. In some embodiments, the set of candidate cells includes cells of a plurality of radio access technologies (RATs). Additionally or alternatively, each candidate cell in the set may be identified by at least one of: a cell identifier, a global cell identifier, a tracking area code, a carrier frequency, a location area code, a routing area code, a service set identifier (SSID), a basic service set identifier (BSSID), or a homogenous extended service set identifier (HESSID).

In various embodiments of the methods, devices, apparatuses, and/or computer program products described above, a radio access technology (RAT) of the second cell may be different from a RAT of the first cell. Additionally or alternatively, the communication between the first and second cells may be communication via a backhaul link.

In various embodiments of the methods, devices, apparatuses, and/or computer program products described above, the selection parameters received from the first cell may include at least one of: a reference signal receive power, a reference signal receive quality, a wireless local area network (WLAN) load, a basic service set (BSS) load, or a wide area network (WAN) metric. In some embodiments, communicating with the first and second cells concurrently includes communicating with the first cell using a first component carrier and communicating with the second cell using a second component carrier. Additionally or alternatively, establishing the independent connection with the second cell may include transmitting an initial access message to the second cell and receiving a response message from the second cell, the response message responsive to the initial access message.

In some embodiments, the methods, devices, apparatuses, and/or computer program product described above may also include the features of, steps for, means for, and/or processor-executable instructions for receiving from the first cell an indication that the wireless device is permitted to establish the independent connection with the second cell.

In some embodiments, the methods, devices, apparatuses, and/or computer program product described above may also include the features of, steps for, means for, and/or processor-executable instructions for determining a parameter associated with each candidate cell in a set of candidate cells and selecting the second cell from the set based at least in part on the determined parameter associated with the second cell.

In some embodiments, the methods, devices, apparatuses, and/or computer program product described above may also include the features of, steps for, means for, and/or processor-executable instructions for determining whether an amount of uplink data in a buffer is above a threshold value and establishing the independent connection with the second cell when the amount of uplink data in the buffer is above the threshold value.

In some embodiments, the methods, devices, apparatuses, and/or computer program product described above may also include the features of, steps for, means for, and/or processor-executable instructions for detecting whether there is available uplink data and establishing the independent connection with the second cell when available uplink data is detected. The independent connection may be established with the second cell based at least in part on a type of application associated with the uplink data detected.

In some embodiments, the methods, devices, apparatuses, and/or computer program product described above may also include the features of, steps for, means for, and/or processor-executable instructions for detecting whether there is available downlink data and establishing the independent connection with the second cell when available downlink data is detected. The independent connection may be established with the second cell based at least in part on a type of application associated with the downlink data detected.

In some embodiments, the methods, devices, apparatuses, and/or computer program product described above may also include the features of, steps for, means for, and/or processor-executable instructions for receiving a cell load indication from the first cell and establishing the independent connection with the second cell based at least in part on the cell load indication received from the first cell.

In some embodiments, the methods, devices, apparatuses, and/or computer program product described above may also include the features of, steps for, means for, and/or processor-executable instructions for receiving a cell load indication from the second cell; and selecting the second cell based at least in part on the cell load indication received from the second cell. Additionally or alternatively, communicating with the first and second cells concurrently may include communicating with the first cell according to a first scheduler associated with the first cell while communicating concurrently with the second cell according to a second scheduler associated with the second cell.

The foregoing has outlined the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
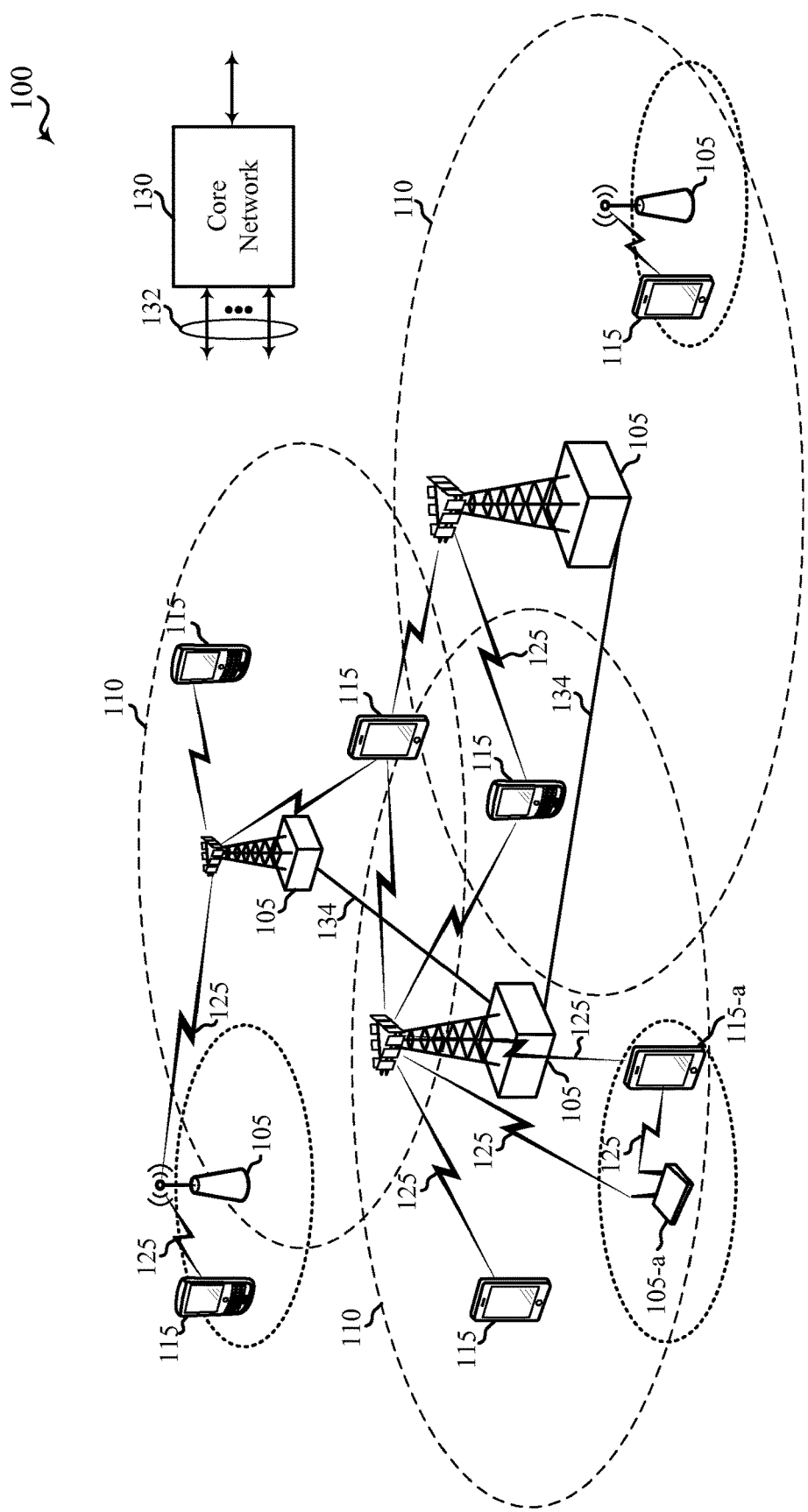
FIG. 1 is a diagram that illustrates an example of a wireless communications system in accordance with various embodiments.

Described embodiments are directed to methods, systems, devices, and apparatuses for wireless communications in which a wireless device (e.g., UE) may identify and select a second cell, such as a small cell (e.g., secondary cell or SCell) and directly establish an independent connection with the second cell based at least in part on selection parameters received from a first cell, such as a macro cell (e.g., primary cell or PCell). The selection parameters may include power and/or quality parameters, as wells as a list or set of candidate cells from which to make the selection. The macro cell and the small cell may be in communication with each other, but they need not be associated with the same base station or eNB (i.e., the cells may not be collocated). Once a connection is established between the wireless device and the small cell, the wireless device is able to communicate with both cells concurrently.

Having uplink data and/or downlink data available for communication may trigger the establishment of the connection between the wireless device and the small cell. For example, the small cell connection may be used for data communication when the uplink/downlink data is associated with certain quality-of-service (QoS) and/or bearer identifier. In response to the availability of the appropriate type of uplink data and/or downlink data, the macro cell may transmit a command to the wireless device to proceed and autonomously (e.g., without involvement from the macro cell) select a small cell. Once the small cell is identified and selected, the wireless device may directly establish an independent connection with the selected small cell.

The ability of a wireless device to effectively and quickly connect to one or more small cells without participation by the macro cell may be desirable in view of current trends in which wireless networks are more likely to use multiple frequency layers and where the network deployments/topologies on each layer is different. For example, the wireless device may be under one coverage layer associated with a macro cell that uses a relatively low frequency (e.g., up to ~2.5 GHz) and may be under another coverage layer that provides data capacity using a small cell deployed in a hotspot fashion (e.g., 3.5 GHz). The macro cell layer may have continuous coverage and may be used for mobility and control signaling. On the other hand, the small cell layer may be used to provide high data rates and the wireless device may need to set up a connection to the small cell quickly and with low signaling load to rapidly enable communication at the high data rates. It should be noted that this scenario is provided by way of illustration and that more than two layers may be involved and/or that each of these layers may include multiple frequency layers themselves (e.g. macro cell deployments and small cell deployments may exist on multiple frequency layers).

The macro cell and small cell described above may be aggregated (e.g., carrier aggregation) such that the wireless device may receive data from any one of the cells depending on channel conditions and/or on the load on each carrier component. Long Term Evolution (LTE) currently supports carrier aggregation with a PCell, which corresponds to a macro cell, and with one or more SCells, which correspond to small cells. The carrier aggregation, however, is supported when the cells are collocated. (i.e., the cells are associated with the same base station or eNB). Cases in which the aggregated cells are not collocated and multiple flows of data occur (e.g., multiflow or dual connectivity) are not currently supported in LTE. To support such cases new schemes may be needed that involve having to reduce the amount of backhaul signaling that is used to coordinate the connections of the wireless device and to track data delivery to the wireless device.

In current carrier aggregation operations (i.e., collocated cells), the base station or eNB where the PCell is located typically controls the resources that the wireless device (e.g., UE) is using and may be responsible for configuring/deconfiguring the SCells. To make proper decisions as to which SCell the wireless device may use, the base station may configure the wireless device to perform measurements on the small cell frequency layer and send reports back to the base station when certain conditions are met (e.g. the signal strength of a small cell is above a certain threshold). This process, however, may cause delays since the wireless device has to perform measurements and send reports, the base station has to make a decision and configure the wireless device appropriately, and additional signaling is involved such as the wireless device sending reports on uplink (UL) and receiving downlink (DL) messages containing commands/configuration information. To reduce these types of delays in non-collocated cases, various embodiments are provided below in which a wireless device (e.g., UE) may identify and select a small cell (e.g., SCell) based at least in part on selection parameters received from a macro cell (e.g., PCell) in order to quickly and effectively (e.g. reduced signaling) establish a connection with the small cell.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. In some cases, a macro cell may be referred to as a primary cell or PCell, while a small cell may be referred to as a secondary cell or SCell, for example. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

In some embodiments of the system 100, a UE 115-*a* may be under the coverage of a macro cell (e.g., PCell) and under the coverage of a small cell 105-*a* (e.g., SCell). When an appropriate trigger condition is met, the PCell may transmit a command to the UE 115-*a* to proceed with the selection of an SCell 105-*a* with which to communicate a certain type of data or traffic. The PCell may also provide selection parameters for the UE 115-*a* to establish criteria for making the selection. The UE 115-*a* may identify and select the SCell 105-*a* and directly establish an independent connection with the SCell 105-*a* based at least in part on selection parameters received from the PCell. The PCell is not involved in the selection of the SCell 105-*a* or in establishing the connection between the UE 115-*a* and the SCell 105-*a*; and as such, the connection with the SCell 105-*a* may be established independent of the connection with the PCell. The selection parameters may include power and/or quality parameters, as wells as a list or set of candidate cells from which to make the selection. The PCell and the SCell 105-*a* may be in communication with each other via backhaul links 134 (e.g., X2 interface) but need not be associated with the same base station or eNB (i.e., the cells are not collocated). Once a connection is established with the SCell 105-*a*, the UE 115-*a* is able to communicate with both cells concurrently.

Figure 2A:
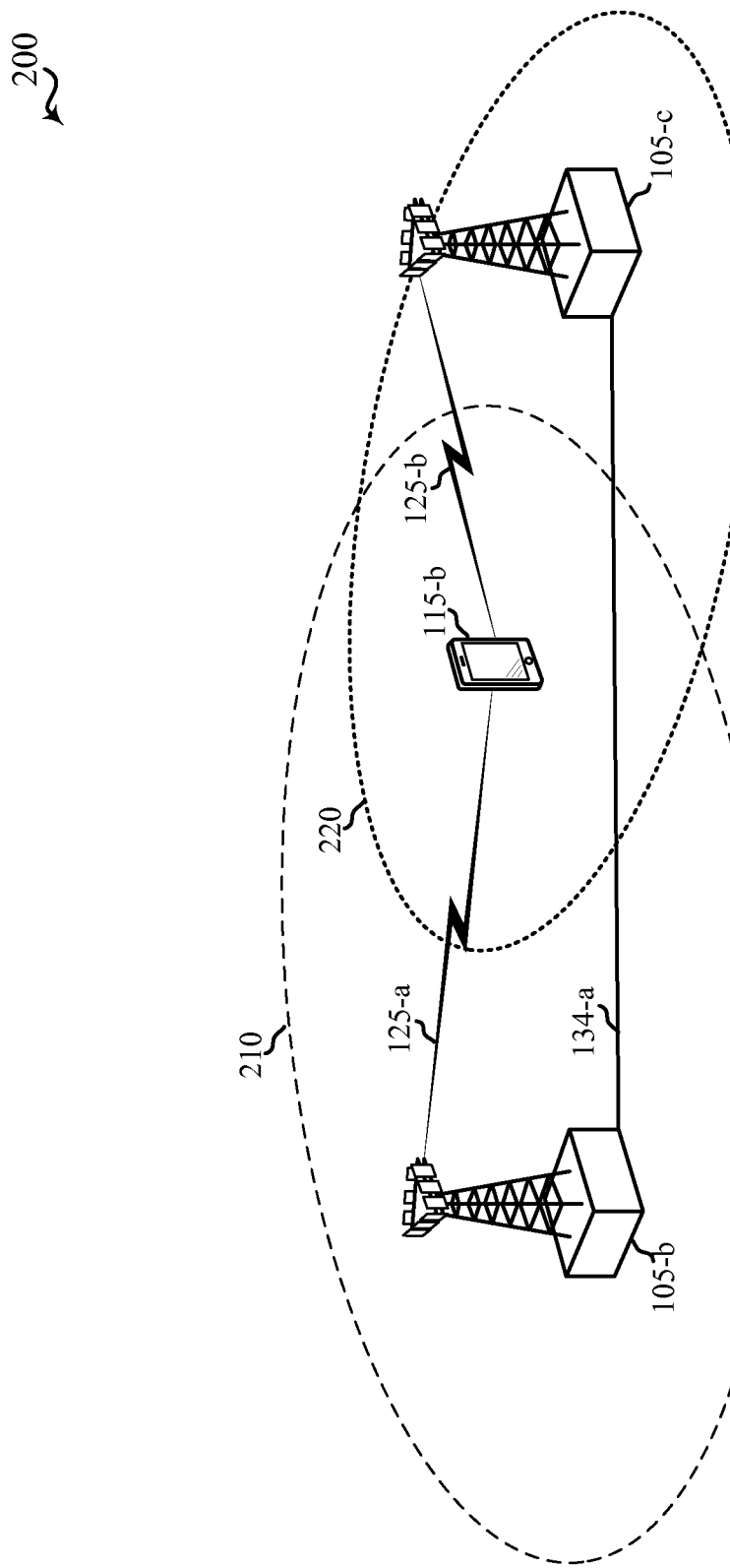
FIGS. 2A and 2B are diagrams that illustrate an example of non-collocated cells in accordance with various embodiments.

FIG. 2A shows a diagram that illustrates an example of a system 200 with non-collocated cells. The system 200 may be part of and/or may be connected to portions of the system 100 of FIG. 1. The system 200 includes a base station 105-*b* associated with a macro cell having cell coverage 210. The macro cell may correspond to a primary cell or PCell and may be referred to as a macro cell 210 because of its corresponding cell coverage 210. The system 200 also includes a base station 105-*c* associated with a small cell having cell coverage 220. The small cell may correspond to a secondary cell or SCell and may be referred to as a small cell 220 because of its corresponding cell coverage 220. The base stations 105-*b* and 105-*c* may be examples of the base stations 105 of FIG. 1.

The system 200 also includes a UE 115-*b*, which may be an example of the UEs 115 of FIG. 1. The UE 115-*b* may communicate with the base station 105-*b* using one or more transmission links 125-*a*. The UE 115-*b* may communicate with the base station 105-*c* using one or more transmission links 125-*b*. In some instances, the UE 115-*b* may communicate with both the base stations (and both cells) concurrently.

In some embodiments, the macro cell 210 and the small cell 220 are non-collocated cells; that is, they are associated with different base stations. When cells are non-collocated, a significant amount of backhaul signaling (e.g., through backhaul links 134-*a*) may be used to coordinate the connections to a UE 115-*b* and to track data delivery to the UE 115-*b*. To reduce the time and the signaling used to establish a connection between the UE 115-*b* and the small cell 220 that may enable the UE 115-*b* to communicate concurrently with both the macro cell 210 and the small cell 220, techniques are described herein that may permit the UE 115-*b* to autonomously identify and select the appropriate small cell with which to communicate and then directly establish an independent connection with the selected small cell without participation of the macro cell. Moreover, these techniques may enable carrier aggregation in LTE for non-collocated cells, such as when multiple flows (i.e., multi-flow) from different cells are used to communicate data to the UE 115-*b*.

Figure 2B:
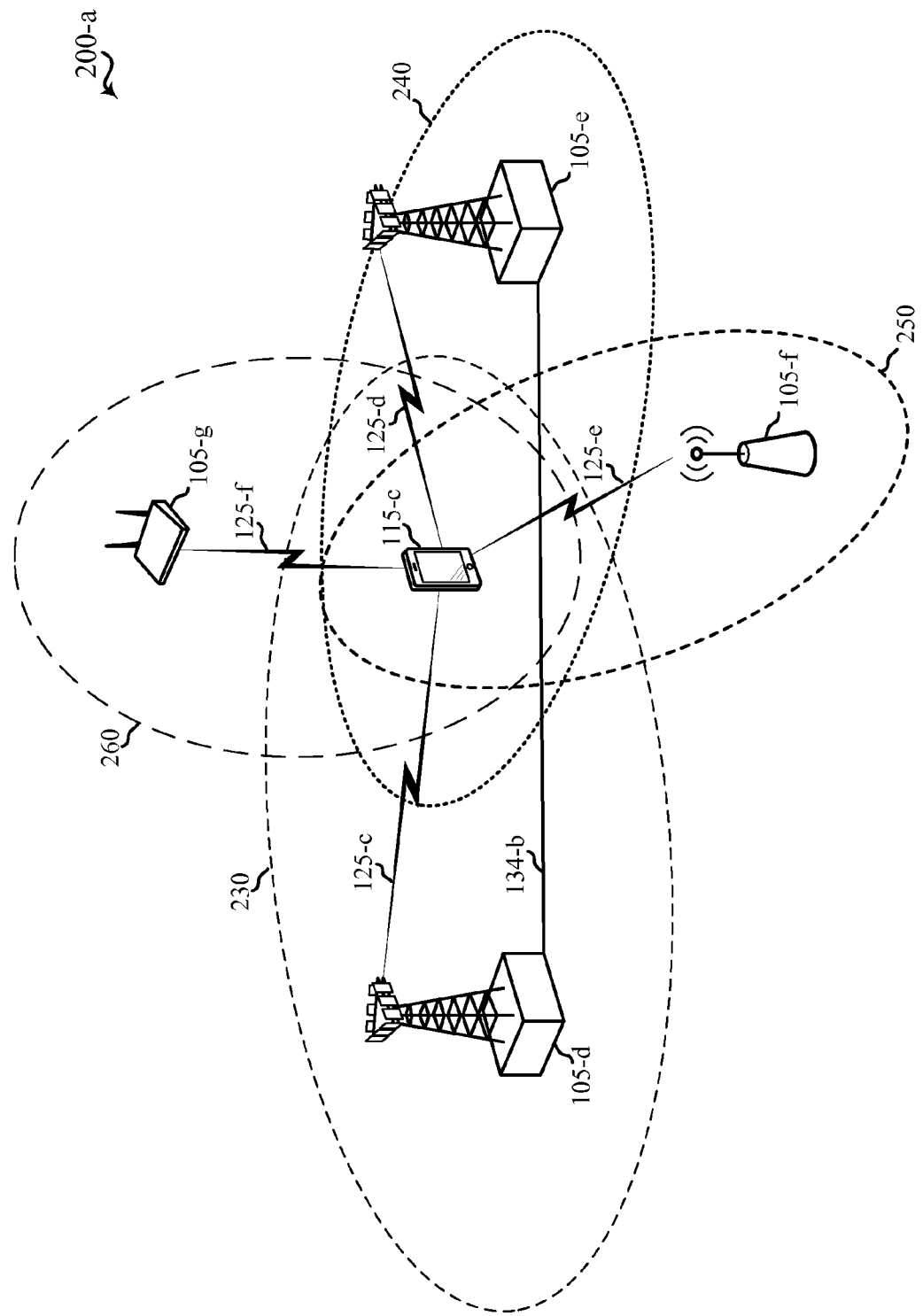

FIG. 2B shows a diagram that illustrates an example of a system 200-*a* with multiple different radio access technologies (RATs). The system 200-*a* may be part of and/or may be connected to portions of the system 100 of FIG. 1 or the system 200 of FIG. 2A. The system 200-*a* includes a base station 105-*d* associated with a first RAT having cell coverage 230. The system 200-*a* also includes a base station 105-*e* associated with a second RAT having cell coverage 240. The system 200-*a* includes a base station 105-*f* associated with a third RAT having cell coverage 250. The system 200-*a* includes a base station 105-*g* associated with a fourth RAT having cell coverage 260. The base stations 105-*d*, 105-*e*, 105-*f*, and 105-*g* may be examples of the base stations 105 of FIG. 1 or base stations 105-*b* or 105-*c* of FIG. 2A.

The system 200-*a* also includes a UE 115-*c*, which may be an example of the UEs 115 of FIG. 1 or 115-*b* or 115-*c* of FIG. 2A. The UE 115-*c* may communicate with the base station 105-*d* using one or more transmission links 125-*c*. The UE 115-*c* may communicate with the base station 105-*e* using one or more transmission links 125-*d*. The UE 115-*c* may communicate with the base station 105-*f* using one or more transmission links 125-*e*. The UE 115-*c* may communicate with the base station 105-*g* using one or more transmission links 125-*f*. In some instances, the UE 115-*c* may communicate with more than one of the base stations (and multiple cells) concurrently.

In some embodiments, the cell of the first RAT 230, the cell of the second RAT 240, the cell of the third RAT 250, and the cell of the fourth RAT 260 are non-collocated cells; that is, they are associated with different base stations. The base stations 105 may be in communication with each other via backhaul links 134-*b* (e.g., X2 interface) but need not be associated with the same base station or eNB. As discussed above, when cells are non-collocated, a significant amount of backhaul signaling (e.g., through backhaul links 134-*b*) may be used to coordinate the connections to a UE 115-*c* and to track data delivery to the UE 115-*c*. While not shown, backhaul links 134-*b* may be present between each of the base stations 105-*d*, 105-*e*, 105-*f*, and 105-*g* of the system 200-*a*. To reduce the time and the signaling used to establish a connection between the UE 115-*c* and multiple cells that may enable the UE 115-*c* to communicate concurrently with cells of different RATs, techniques are described herein that may permit the UE 115-*c* to autonomously identify and select the appropriate cell with which to communicate and then directly establish an independent connection with the selected cell without participation of another cell. Moreover, these techniques may enable carrier aggregation in LTE for non-collocated cells, such as when multiple flows (i.e., multiflow) from different cells are used to communicate data to the UE 115-*c*. As a point of illustration, the first, second, third, and fourth RATs may include LTE, UMTS, GSM, and a wireless local area network (WLAN) technology, such as IEEE 802.11 ("WiFi"), or any combination thereof.

Figure 3A:
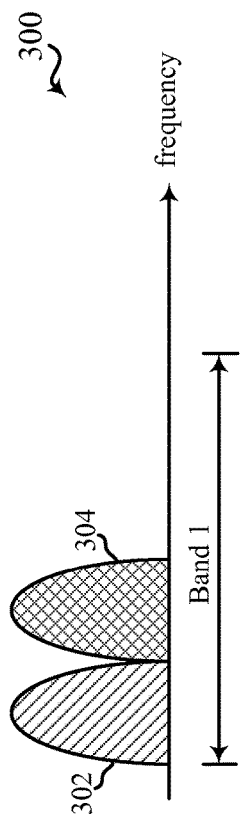
FIGS. 3A-3C are diagrams that illustrate examples of carrier aggregation in non-collocated cells in accordance with various embodiments.
Figure 3B:
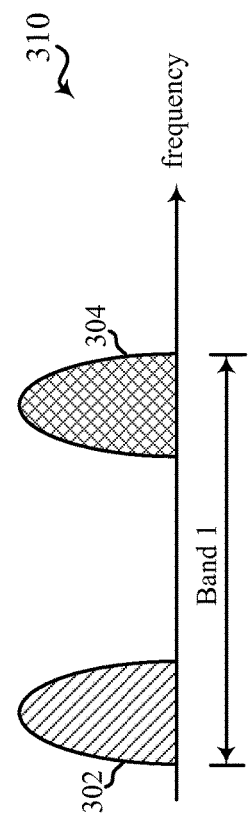
Figure 3C:
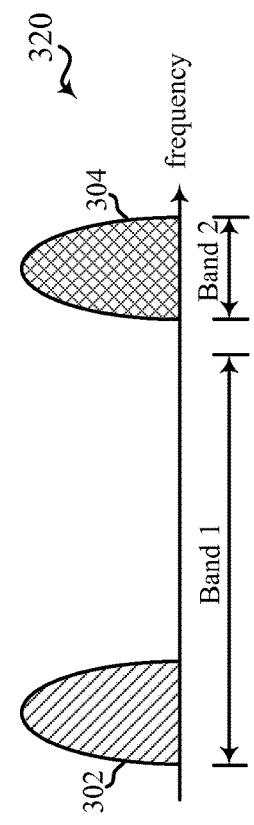

FIGS. 3A, 3B, and 3C show diagrams 300, 310, and 320 that illustrate different examples of carrier aggregation in non-collocated cells such as those shown in FIG. 2A or 2B. Diagram 300 shows an example of contiguous intra-band carrier aggregation in which a carrier component 302 associated with one cell (e.g., macro cell or PCell) and a carrier component 304 associated with another cell (e.g., small cell or SCell) are next to each other in the same band, band 1. Diagram 310 shows an example of non-contiguous intra-band carrier aggregation in which the carrier components 302 and 304 are in the same band (band 1) but separate from each other. Diagram 320 shows an example of non-contiguous inter-band carrier aggregation in which the carrier components 302 and 304 are in separate bands (band 1 and band 2).

The diagrams of FIGS. 3A, 3B, and 3C illustrate different types of carrier aggregation that may be used with non-collocated cells when the various cells are used to enable multiple flows of data. Moreover, the diagrams of FIGS. 3A, 3B, and 3C are provided by way of illustration and not of limitation. That is, there may be component carrier arrangements that have different contiguous, non-contiguous, intra-band, and/or inter-band schemes than those depicted in diagrams 300, 310, and 320, where arrangements are also applicable to non-collocated cells that support multiple flows of data.

Figure 4A:
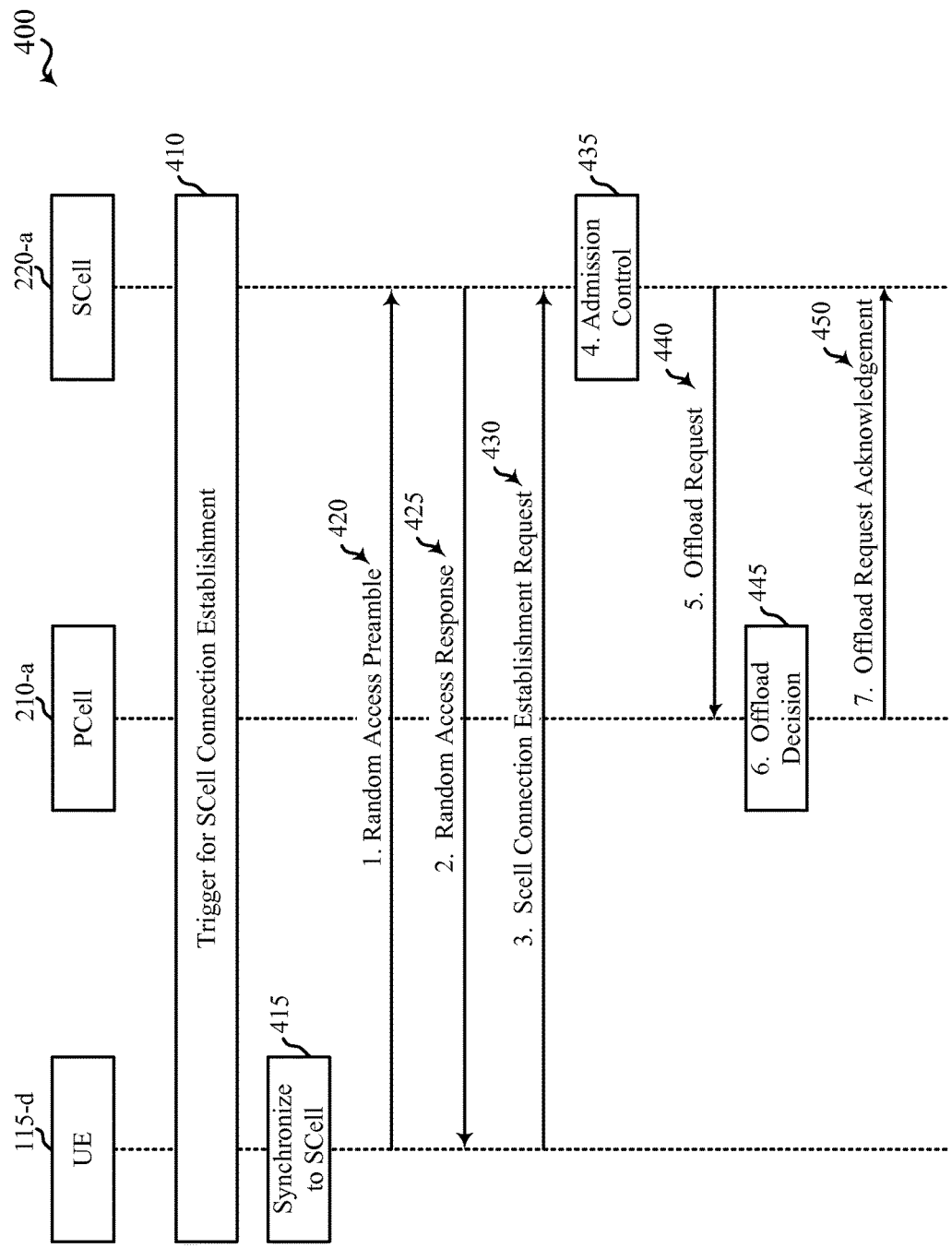
FIGS. 4A-4C are diagrams that illustrate an example of a call flow for establishing an independent connection between a user equipment and a second cell in accordance with various embodiments.
Figure 4B:
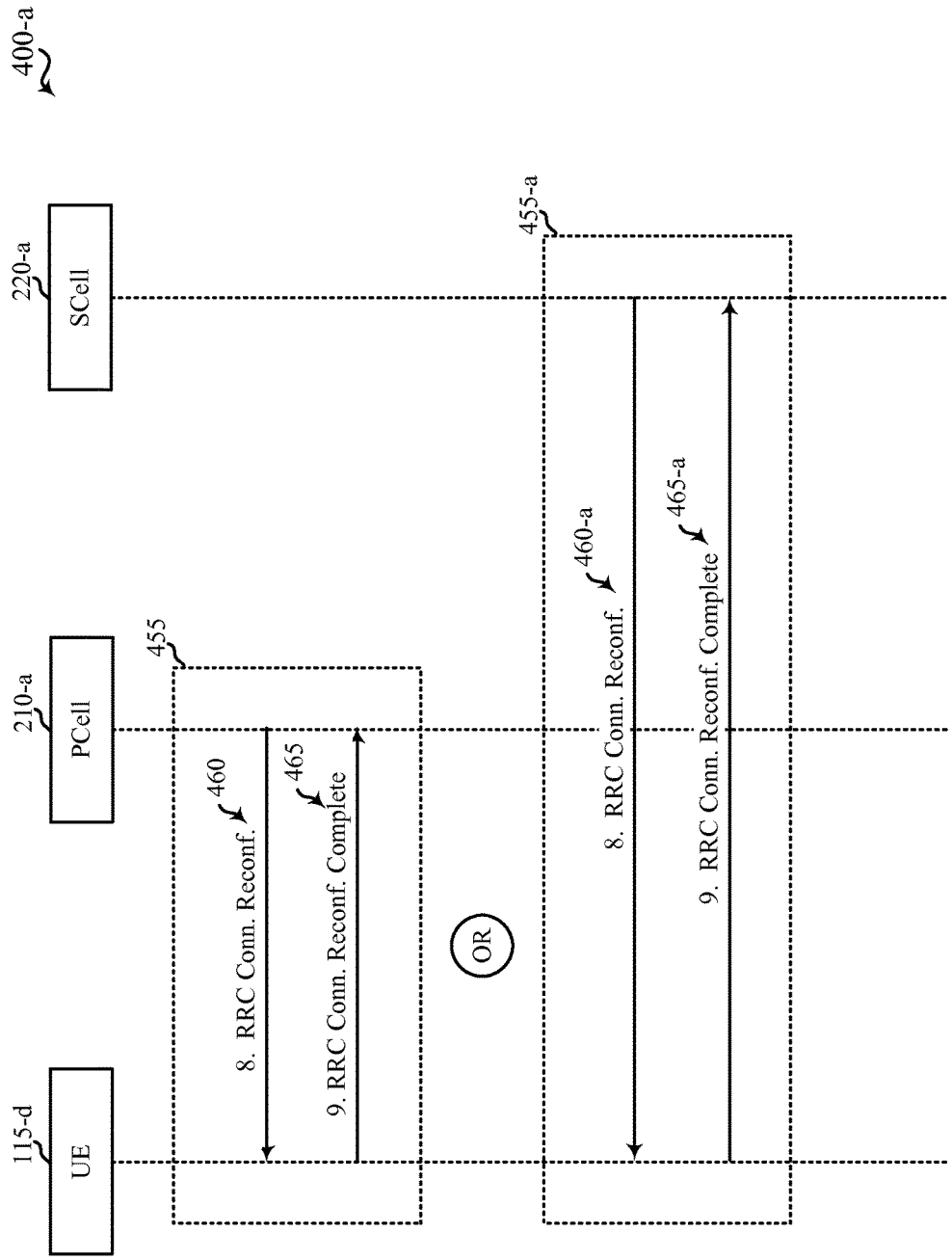
Figure 4C:
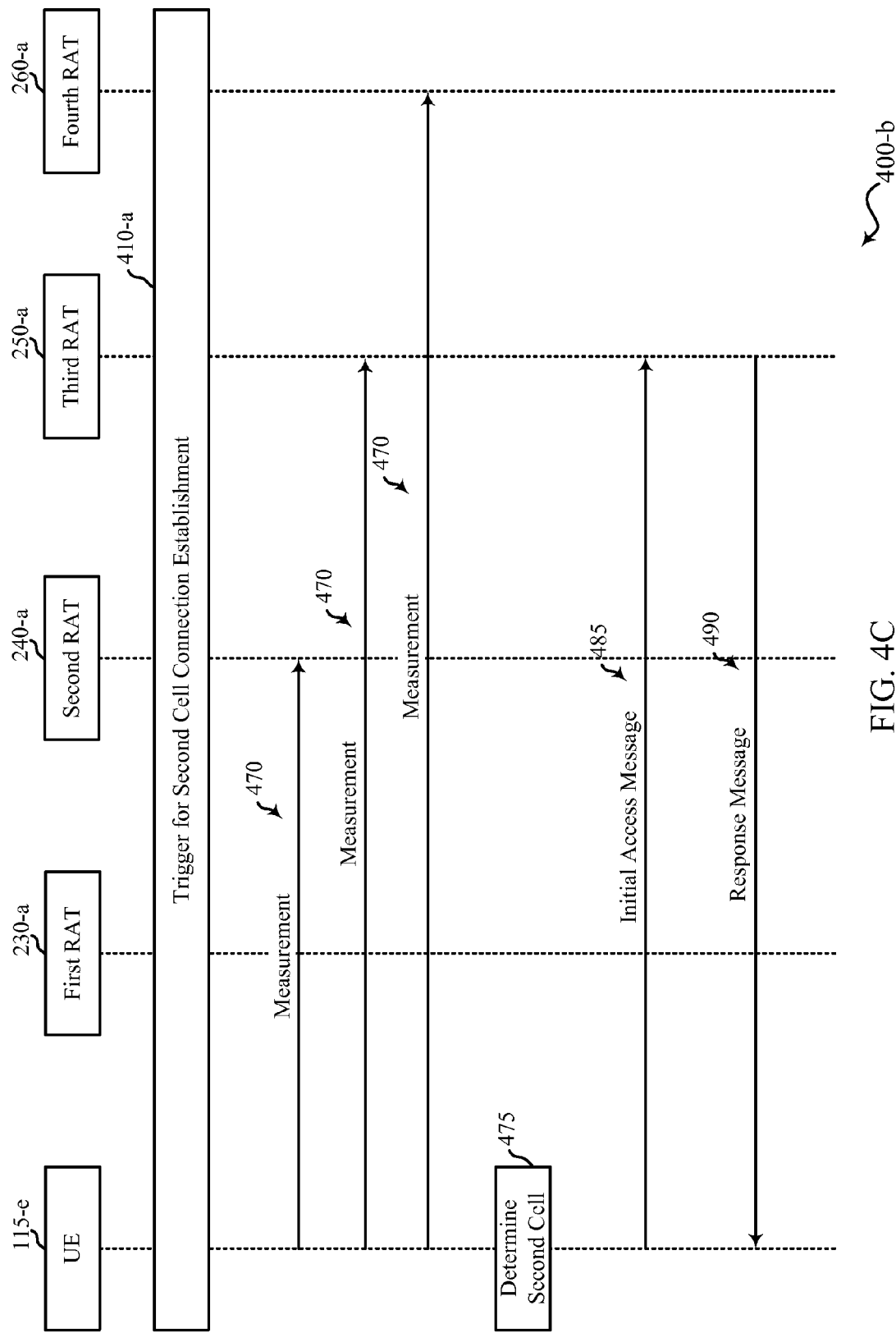

As described above, it may be desirable to reduce the time and/or signaling used to establish a connection between a UE (e.g., UE 115) and a second cell (e.g., SCell) in multi-flow operations when the second cell and the first cell (e.g., PCell) are not collocated. FIGS. 4A, 4B, and 4C illustrate examples of signaling for directly establishing an independent connection between a UE and a second cell. For example, FIG. 4A shows a call flow diagram 400 that describes an example of the signaling that may take place between a UE 115-d, a PCell 210-a, and an SCell 220-a when the UE 115-d establishes an independent connection with the SCell 220-a. The UE 115-d may be an example of the UEs 115 in FIG. 1, FIG. 2A, and FIG. 2B, the PCell 210-a may be an example of the macro cell 210 in FIG. 2A, and the SCell 220-a may be an example of the small cell 220 of FIG. 2A.

At 410, some event may trigger the need for a connection between the UE 115-d and the SCell 220-a. Although not shown, the PCell 210-a may transmit a command to the UE 115-d to initiate an autonomous selection and independent connection to an SCell. In this regard, the PCell 210-a may also transmit selection parameters that may be used by the UE 115-d to establish criteria for the selection of an SCell from a set of candidate cells. The UE 115-d may then make various measurements that enable it to identify and select a suitable SCell candidate, which in this example is the SCell 220-a.

At 415, the UE 115-d may synchronize to the SCell 220-a. Once synchronized, at 420 (1), the UE 115-d may transmit a random access preamble to the SCell 220-a as part of a random access channel (RACH) procedure for initial access to the SCell 220-a. At 425 (2) the SCell 220-a may respond to the random access preamble by transmitting a random access response to the UE 115-d.

At 430 (3), the UE 115-d may transmit an SCell connection establishment request to the SCell 220-a. At 435 (4), the SCell 220-a may process the request from the UE 115-d through an admission control. At 440 (5), the SCell 220-a, in response to the admission control process, may transmit an offload request to the PCell 210-a. The PCell 210-a, at 445 (6), may make a decision regarding the offload request from the SCell 220-a. At 450 (7), the PCell 210-a may transmit an offload request acknowledgment to the SCell 220-a after an offload decision is made.

FIG. 4B shows a diagram 400-a that illustrates additional signaling from that shown in diagram 400 of FIG. 4A. For example, after 450 in FIG. 4A, at 455, there may be a radio resource control (RRC) exchange between the UE 115-d and the PCell 210-a. At 460 (8), the PCell 210-a may transmit an RRC connection reconfiguration message to the UE 115-d and, at 465 (9), the UE 115-d may transmit an RRC connection reconfiguration complete message back to the PCell 210-a.

Alternatively, after 450 in FIG. 4A, at 455-a, there may be an RRC exchange between the UE 115-d and the SCell 220-a. At 460-a (8), the SCell 220-a may transmit an RRC connection reconfiguration message to the UE 115-d and, at 465-a (9), the UE 115-d may transmit an RRC connection reconfiguration complete message back to the SCell 220-a.

FIG. 4C shows a call flow diagram 400-b that describes an example of the signaling that may take place between a UE 115-e, a first RAT 230-a, a second RAT 240-a, a third RAT 250-a, and a fourth RAT 260-a when the UE 115-e establishes an independent connection with a second cell. The UE 115-e may be an example of the UEs 115 in FIG. 1, FIG. 2A, FIG. 2B, FIG. 4A, and FIG. 4B, the first RAT 230-a, second RAT 240-a, third RAT 250-a, or fourth RAT 260-a may be an example of the macro cell 210 in FIG. 2A, the small cell 220 of FIG. 2A, the first RAT 230 of FIG. 2B, the second RAT 240 of FIG. 2B, the third RAT 250 of FIG. 2B, the fourth RAT 260 of FIG. 2B, the PCell 210-a of FIG. 4A, or the SCell 220-a of FIG. 4A.

At 410-a, some event may trigger the need for a connection between the UE 115-e and a second cell. As illustrated, the UE 115-e may already have a connection established with the first RAT 230-a. Although not shown, the first RAT 230-a may transmit a command to the UE 115-e to initiate an autonomous selection and independent connection to a second cell. The first RAT 230-a may also transmit selection parameters that may be used by the UE 115-e to establish criteria for the selection of a second cell from a set of candidate cells. The set of candidate cells may include cells of different RATs. For example, the set of candidate cells may include the second RAT 240-a, the third RAT 250-a, and the fourth RAT 260-a.

At 470 the UE 115-e may make various measurements that enable it to identify and select a suitable second cell candidate. For example, the first RAT 230-a may not be included in the measurements, to avoid redundancy, as a connection with the first RAT 230-a has already been established. Or, in some cases, the first RAT 230-a is not included in the measurements because it was not included in the set of candidate cells.

At 475 the UE 115-e may determine with which cell it would like to establish a second independent connection. For example, the third RAT may be determined as the desirable second cell to be used. This determination may be based on a number of different factors. In some cases, the determination is made based on which other cell exceeds a threshold. The threshold may be included in the selection parameters from the first cell. The determination may be made based on a predetermined hierarchy of the RATs. For example, LTE may be prioritized over WLAN, which may be prioritized over UMTS, which may be prioritized over GSM, or other such prioritizations. In some cases, an algorithm, such as a combination of a factor relating to a prioritization level of the network may be used along with the measurements to determine the desired second cell. In this case, if a less preferred RAT has significantly stronger signals than a more preferred RAT, the algorithm may determine that the less preferred RAT should be chosen since the signal strength outweighs the less preferred RAT. In some cases, the cell with the most available resources may be selected. In some examples, the cell with the most maximum throughput may be selected. In some cases, the cell with the closest base station may be selected. Any of the discussed methods to determine which cell should be selected as the second cell may be used in combination with another. Furthermore, those of skill in the art will recognize there are many ways to determine which cell (and/or RAT) may be selected for use as the second cell.

At 485, the UE 115-e may transmit an initial access message to the second cell 250-a. The second cell 250-a may then transmit a response message 490 to the UE 115-e. The response message 490 may be responsive to the initial access message from the UE 115-e.

It should be noted that the initial access message 485 and the response message 490 are used to represent the message(s) exchanged that are used to establish an independent connection with the selected second cell 250-*a*. There may be multiple messages exchanged from the UE 115-*e* to the second cell 250-*a*, and/or multiple messages exchanged from the second cell 250-*a* to the UE 115-*e*. The messages may occur in any order as well. For example, the initial access message may include a random access preamble as part of a random access channel (RACH) procedure for initial access to the second cell 250-*a*. The response message 490 may include a random access response to the UE 115-*e*. In some cases, the initial access message may include a radio resource control (RRC) connection request. The response message 490 may include an RRC connection setup message in responsive to the RRC connection request. The initial access message may further include an RRC connection setup complete message responsive to the RRC connection setup message. In some cases, the initial access message 485 may include a probe request message, an association request message, and/or an authentication request message. Further, the response message 490 may include a probe response message, an association response message, and/or an authentication response message. In some cases, the initial access message 485 may include a radio resource (RR) channel request message. The response message 490 may include an RR immediate assignment message responsive to the RR channel request message.

After the response message 490, an independent connection may be established between the UE 115-*e* and the second cell 250-*a*. The UE 115-*e* may thus communicate with the first cell 230-*a* and the second cell 250-*a* concurrently.

The signaling shown in the examples of FIG. 4A, FIG. 4B, and FIG. 4C are provided for illustrative purposes and are not intended to limit the disclosure. For example, some variations of the signaling shown in FIG. 4A, FIG. 4B, and FIG. 4C may also be used that may reduce the time and/or signaling used to establish a connection between a UE and a second cell (e.g., SCell) in multiflow operations when the second cell and the first cell (e.g., PCell) are not collocated.

Figure 5:
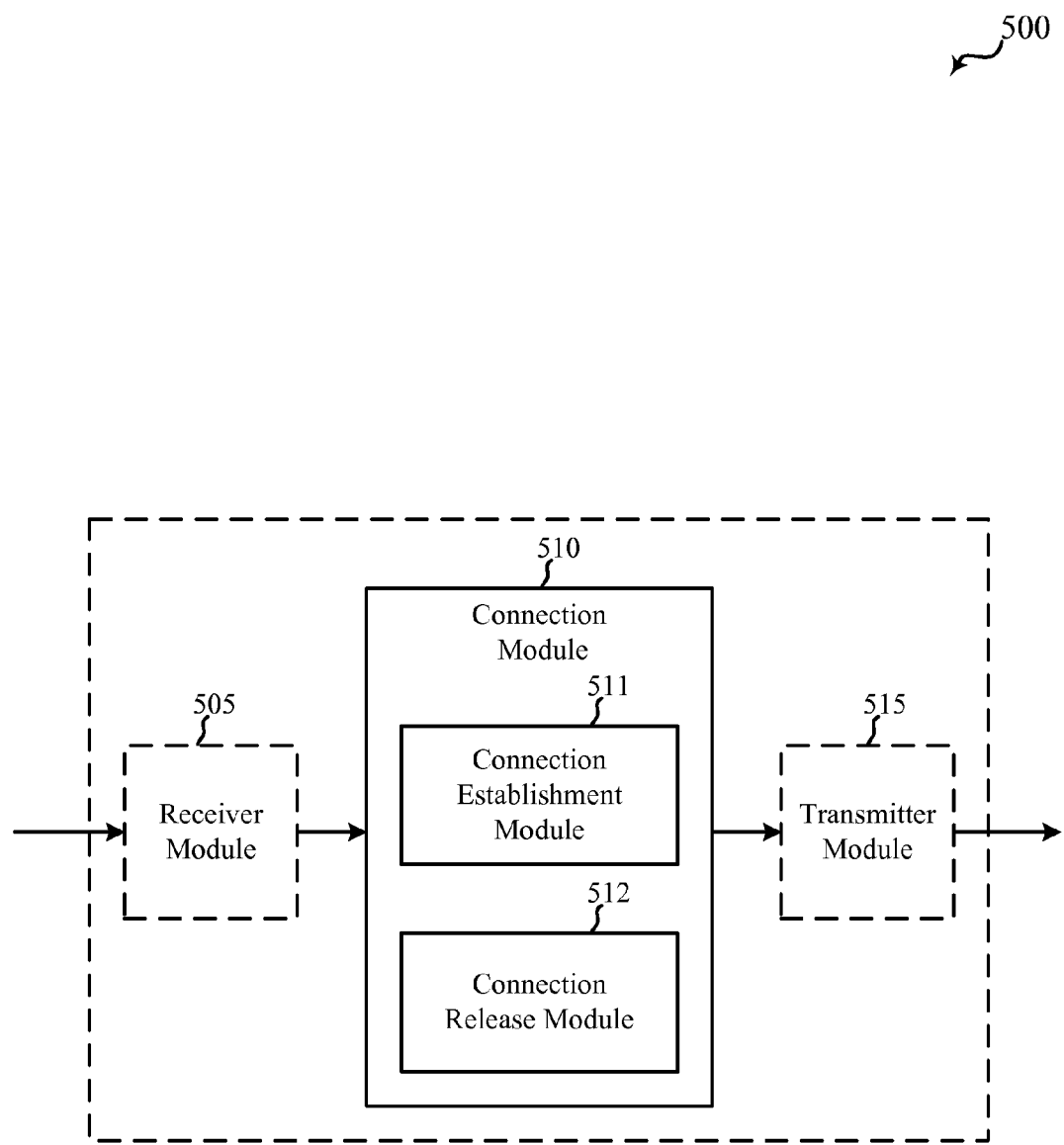
FIG. 5 is a block diagram that illustrates an example of a device configured for establishing and releasing an SCell connection in accordance with various embodiments.

Turning to FIG. 5, a block diagram illustrates a device 500 configured for establishing and releasing an SCell connection in accordance with various embodiments. The device 500 may be an example of one or more aspects of the UEs 115 described with reference to FIG. 1, FIG. 2A, FIG. 2B, FIG. 4A, FIG. 4B, FIG. 4C, FIG. 7, and FIG. 9. The device 500 may be an example of one or more aspects of the base stations 105 described with reference to FIG. 1, FIG. 2A, FIG. 2B, FIG. 8, and FIG. 9. Moreover, the device 500 may be an example of one or more aspects of the PCells 210, SCells 220 of FIG. 2A, FIG. 4A, and FIG. 4B, and/or the cells 230, 240, 250, or 260 of FIG. 2B and FIG. 4C. The device 500 may also be a processor. The device 500 may include a receiver module 505, a connection module 510, and/or a transmitter module 515. The connection module 510 may include a connection establishment module 511 and a connection release module 512. Each of these components may be in communication with each other.

The device 500, through the receiver module 505, the connection establishment module 511 in the connection module 510, and/or the transmitter module 515, may be configured for use in a UE (e.g. UE 115) to establish an SCell connection with the UE. In such cases, the device 500 may be configured to receive selection parameters from a PCell (e.g. PCell 210), and identify and select an SCell based at least in part on the selection parameters received from the PCell. The PCell may be associated with a first base station and the SCell may be associated with a second base station (e.g., the cells may be non-collocated). Moreover, the PCell and the SCell may be in communication with each other, which may facilitate multiple flows of data to the UE. The device 500 may be configured to establish an independent connection with the SCell, and to communicate with the PCell and the SCell concurrently. The PCell may correspond to, for example, the macro cell 210 of FIG. 2, while the SCell may correspond to, for example, the small cell 220 also of FIG. 2.

In some embodiments for use in a UE, the device 500 is configured to receive as part of the selection parameters from the PCell a set of candidate cells from which to select the SCell. Each candidate cell in the set may be identified by one or more of a cell identifier (e.g., physical cell ID or PCI), a global cell identifier (e.g., global cell ID or GCI), a tracking area code (TAC), and a carrier frequency (e.g., E-UTRA absolute radio frequency channel number or EARFCN). In some embodiments, the selection parameters received from the PCell include one or more of a reference signal receive power (RSRP) and a reference signal receive quality (RSRQ). In some embodiments, the device 500 is configured to measure a parameter associated with each candidate cell in the set, and to select the SCell from the set based at least in part on the measured parameter associated with the second cell.

In some embodiments for use in a UE, the device 500 is configured to communicate with the PCell and the SCell concurrently by communicating with the PCell using a first component carrier, and communicating with the SCell using a second component carrier. In some embodiments, the device 500 is configured to directly establish a connection (e.g., establish an independent connection) with the SCell by transmitting an initial access message, such as a random access preamble, to the SCell, and by receiving a response message, such as a random access response, from the SCell in response to the initial access message (see e.g., FIG. 4A).

In some embodiments for use in a UE, the device 500 is configured to receive from the PCell an indication that the UE is permitted to directly establish the independent connection (e.g., establish an independent connection) with the SCell. The indication may be received through, for example, a physical downlink control channel (PDCCH).

In some embodiments for use in a UE, the device 500 is configured to determine whether an amount of uplink data in a buffer is above a threshold value, and to establish the independent connection with the SCell when the amount of uplink data in the buffer is above the threshold value. In some embodiments, the device 500 is configured to detect whether there is available uplink data, and to establish the independent connection with the SCell when available uplink data is detected. For example, the device 500 may be configured to autonomously connect to the SCell upon the arrival of uplink data. The available uplink data may be associated with selected one or more of a quality-of-service and a bearer identifier. In some embodiments, the independent connection is established with the SCell based at least in part on the type of application associated with the uplink data detected.

In some embodiments for use in a UE, the device 500 is configured to detect whether there is available downlink data, and to establish the independent connection with the SCell when available downlink data is detected. For example, the device 500 may be configured to autonomously connect to the SCell upon the arrival of downlink data. The downlink data may be associated with selected one or more of a quality-of-service and a bearer identifier. In some embodiments, the independent connection is established with the SCell based at least in part on the type of application associated with the downlink data detected.

In some embodiments for use in a UE, the device 500 is configured to receive a cell load indication from the PCell, and to establish the independent connection with the SCell based at least in part on the cell load indication received from the PCell. In some embodiments, the device 500 is configured to receive a cell load indication from the SCell, and to select the SCell based at least in part on the cell load indication received from the SCell.

In some embodiments for use in a UE, the device 500 is configured to communicate with the PCell and the SCell concurrently by communicating with the PCell according to a first scheduler associated with the PCell while communicating concurrently with the SCell according to a second scheduler associated with the SCell.

The device 500, through the receiver module 505, the connection establishment module 511 in the connection module 510, and/or the transmitter module 515, may be configured for use in a PCell (e.g. PCell 210) to handle aspects related to establishing an SCell connection with a UE. In such cases, the device 500 may be configured to transmit selection parameters to the UE to establish criteria for the UE to use in selecting the SCell with which to establish an independent connection. The PCell may be associated with a first base station and the SCell may be associated with a second base station (i.e., the cells are non-collocated). Moreover, the PCell and the SCell may be in communication with each other, which may facilitate multiple flows of data to the UE. In some embodiments, the device 500 is configured to communicate with the UE when the connection between the UE and the SCell is established and the UE is in communication with the SCell. The PCell may correspond to, for example, the macro cell 210 of FIG. 2A, while the SCell may correspond to, for example, the small cell 220 also of FIG. 2A.

In some embodiments for use in a PCell, the device 500 is configured to receive from the SCell an indication that the connection between the UE and the SCell is established. The indication may be received through a backhaul link interface (e.g., X2). In some embodiments, the device 500 is configured to transmit an RRC connection reconfiguration message to the UE when the connection between the UE and the SCell is established, and to receive an RRC connection reconfiguration complete message from the UE in response to the RRC connection reconfiguration message (see e.g., FIG. 4B).

In some embodiments for use in a PCell, the device 500 is configured to transmit a command to the UE to select an SCell with which to directly establish a connection (e.g., an independent connection). The command may be transmitted through, for example, PDCCH. In some embodiments, the device 500 is configured to detect whether there is available uplink data, and the transmission of the command to the UE is triggered based at least in part on whether available uplink data is detected. The available uplink data may be associated with selected one or more of a quality-of-service and a bearer identifier. In some embodiments, the device 500 is configured to detect whether there is available uplink data, and the transmission of the command to the UE is triggered based at least in part on the type of application associated with the available uplink data detected.

In some embodiments for use in a PCell, the device 500 is configured to detect whether there is available downlink data, and the transmission of the command to the UE is triggered based at least in part on whether available downlink data is detected. The available downlink data may be associated with selected one or more of a quality-of-service and a bearer identifier. In some embodiments, the device 500 is configured to detect whether there is available downlink data, and the transmission of the command to the UE is triggered based at least in part on the type of application associated with the available downlink data detected.

The device 500, through the receiver module 505, the connection establishment module 511 in the connection module 510, and/or the transmitter module 515, may be configured for use in an SCell (e.g. SCell 220) to handle aspects related to establishing a connection between the SCell and a UE. In such cases, the device 500 may be configured to receive a request to connect from a UE based at least in part on selection parameters received by the UE from a PCell. In some embodiments, the device 500 is configured to establish a connection with the UE. In some embodiments, the device 500 is configured to communicate with the UE while the UE is concurrently in communication with the PCell. The PCell may be associated with a first base station and the SCell may be associated with a second base station (i.e., the cells are non-collocated). Moreover, the PCell and the SCell may be in communication with each other, which may facilitate multiple flows of data to the UE. The PCell may correspond to, for example, the macro cell 210 of FIG. 2A, while the SCell may correspond to, for example, the small cell 220 also of FIG. 2A.

In some embodiments for use in an SCell, the device 500 is configured to transmit to the PCell an indication that the connection with the UE is established. The indication may be transmitted through a backhaul link interface (e.g., X2).

In some embodiments for use in an SCell, the device 500 is configured to transmit an RRC connection reconfiguration message to the UE when the connection between the UE and the SCell is established, and to receive an RRC connection reconfiguration complete message from the UE in response to the RRC connection reconfiguration message.

Once a connection between an SCell and a UE is established, the device 500 may be configured to handle aspects related to releasing the SCell connection. For example, the device 500 may be configured for use in a UE to determine that an SCell connection with the UE is to be released. The release may result from poor link quality or other performance metric. The device 500 may be configured to then transmit an indication to the PCell that the SCell connection is to be released.

Figure 6A:
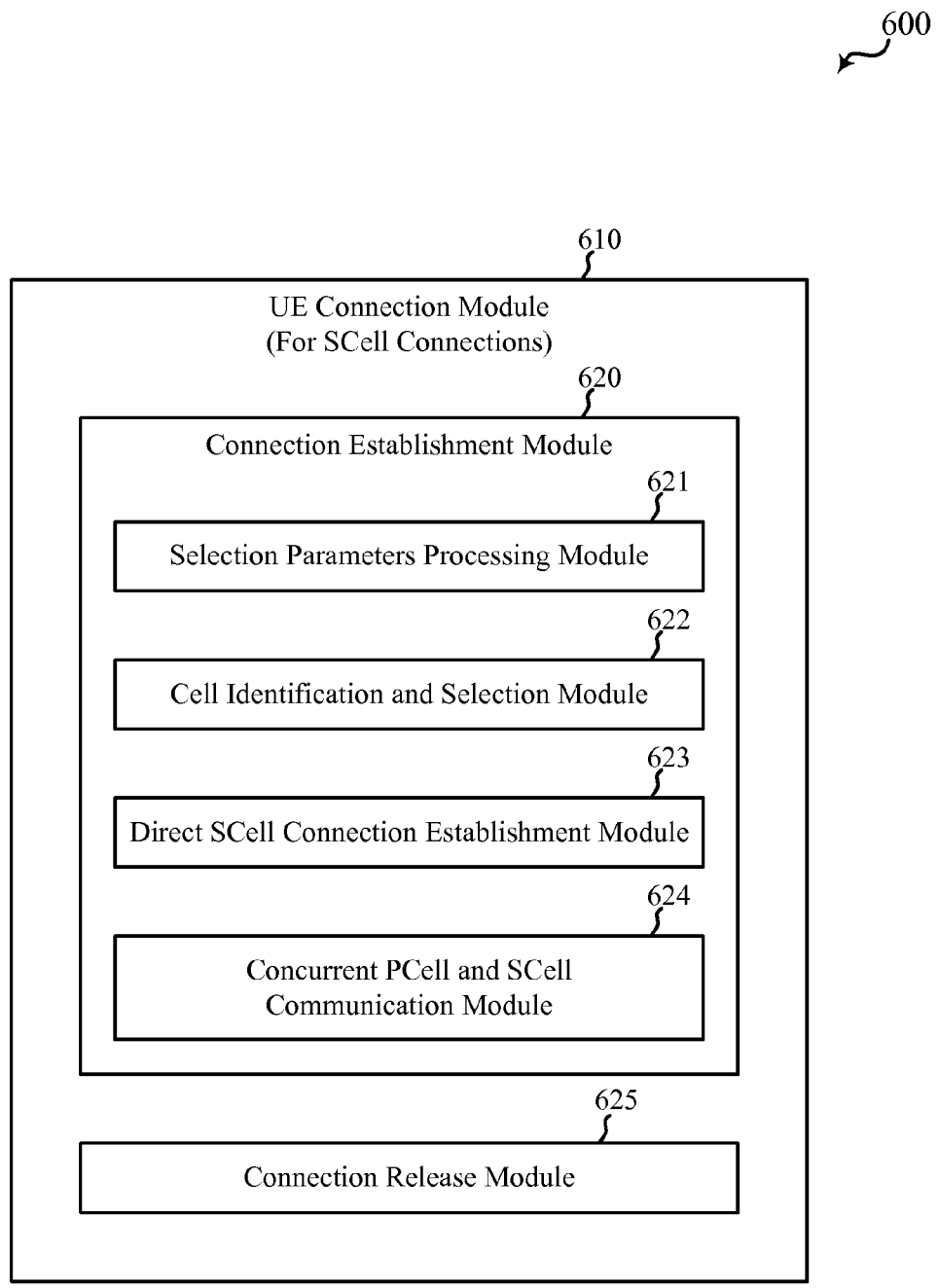
FIG. 6A is a block diagram that illustrates an example of a user equipment module configured for establishing and releasing an SCell connection in accordance with various embodiments.

Turning next to FIG. 6A, a diagram 600 includes a UE connection module 610 for use in SCell connections. The UE connection module 610 may include aspects of the device 500 of FIG. 5 when configured for use in a UE to establish and/or release an SCell connection. In such cases, the UE connection module 610 may be an example of the connection module 510 of FIG. 5. The UE connection module 610 may include a connection establishment module 620 and a connection release module 625, which may be examples of the connection establishment module 511 and the connection release module 512 of FIG. 5, respectively.

The connection establishment module 620 may include a selection parameters processing module 621, a cell identification and selection module 622, a direct SCell connection establishment module 623, and a concurrent PCell and SCell communication module 624. The selection parameters processing module 621 may be configured to perform various functions described herein related to using or processing selection parameters received from a PCell. The cell identification and selection module 622 may be configured to perform various functions described herein related to identifying and selecting a suitable SCell with which to directly establish an independent connection. The direct SCell connection establishment module 623 may be configured to perform various functions described herein related to directly establishing an independent connection with a selected SCell. The concurrent PCell and SCell communication module 624 may be configured to perform various functions described herein related to having the UE communicate concurrently with the PCell and the SCell.

The connection release module 625 may be configured to perform various functions related to releasing the SCell connection in response to a determination that the SCell connection does not meet one or more performance metrics.

Figure 6B:
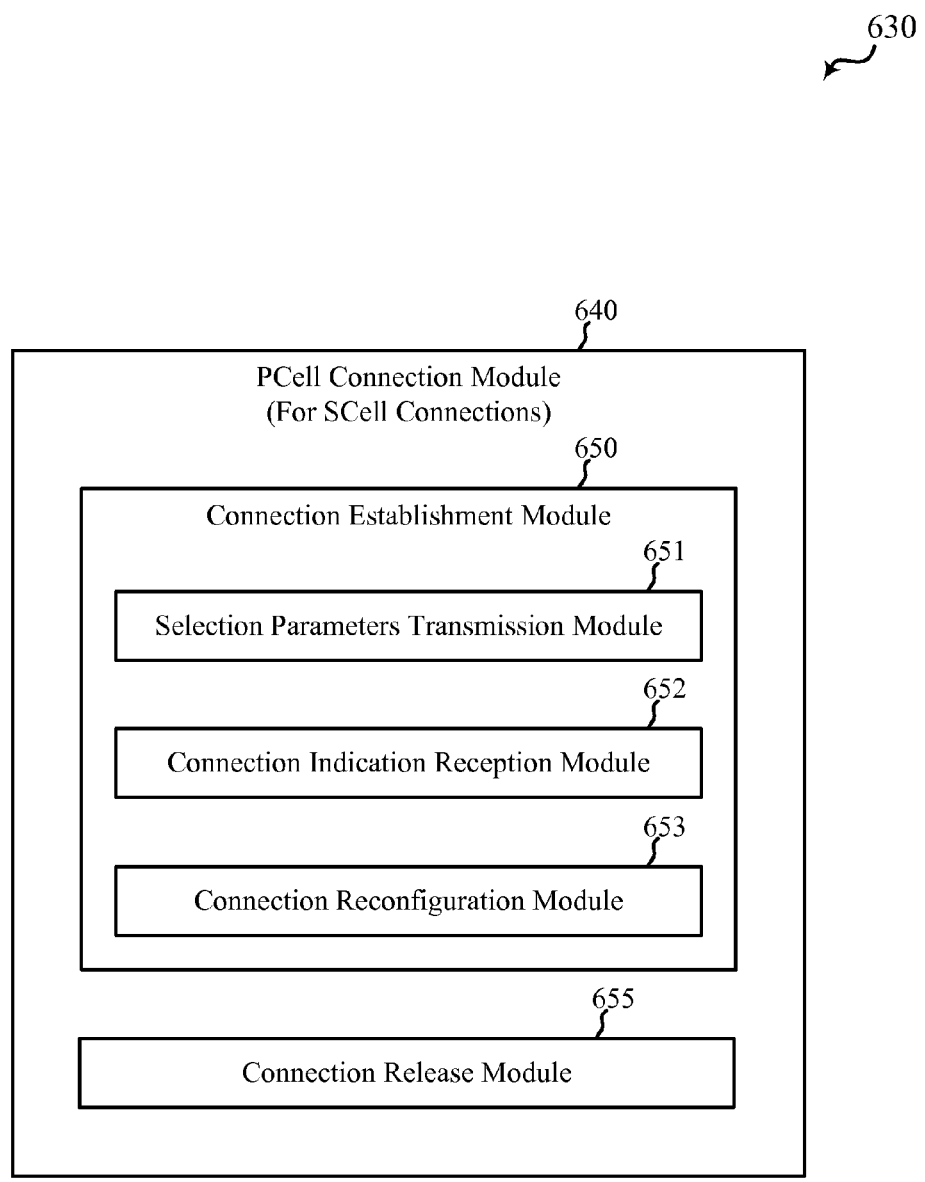
FIG. 6B is a block diagram that illustrates an example of a PCell module configured for handling aspects related to an SCell connection in accordance with various embodiments.

FIG. 6B shows a diagram 630 that includes a PCell connection module 640 for use in SCell connections. The PCell connection module 640 may include aspects of the device 500 of FIG. 5 when configured for use in a PCell to establish and/or release an SCell connection. In such cases, the PCell connection module 640 may be an example of the connection module 510 of FIG. 5. The PCell connection module 640 may include a connection establishment module 650 and a connection release module 655, which may be examples of the connection establishment module 511 and the connection release module 512 of FIG. 5, respectively.

The connection establishment module 650 may include a selection parameters transmission module 651, a connection indication reception module 652, and a connection reconfiguration module 653. The selection parameters transmission module 651 may be configured to perform various functions described herein related to determining and transmitting selection parameters to a UE to establish criteria for selecting an SCell with which to directly establish an independent connection. The connection indication reception module 652 may be configured to perform various functions described herein related to receiving an indication from an SCell that a connection between the SCell and the UE has been established. The connection reconfiguration module 653 may be configured to perform various functions described herein related to exchanging RRC configuration messages with the UE.

The connection release module 655 may be configured to perform various functions related to releasing the SCell connection in response to a determination that the SCell connection does not meet one or more performance metrics.

Figure 6C:
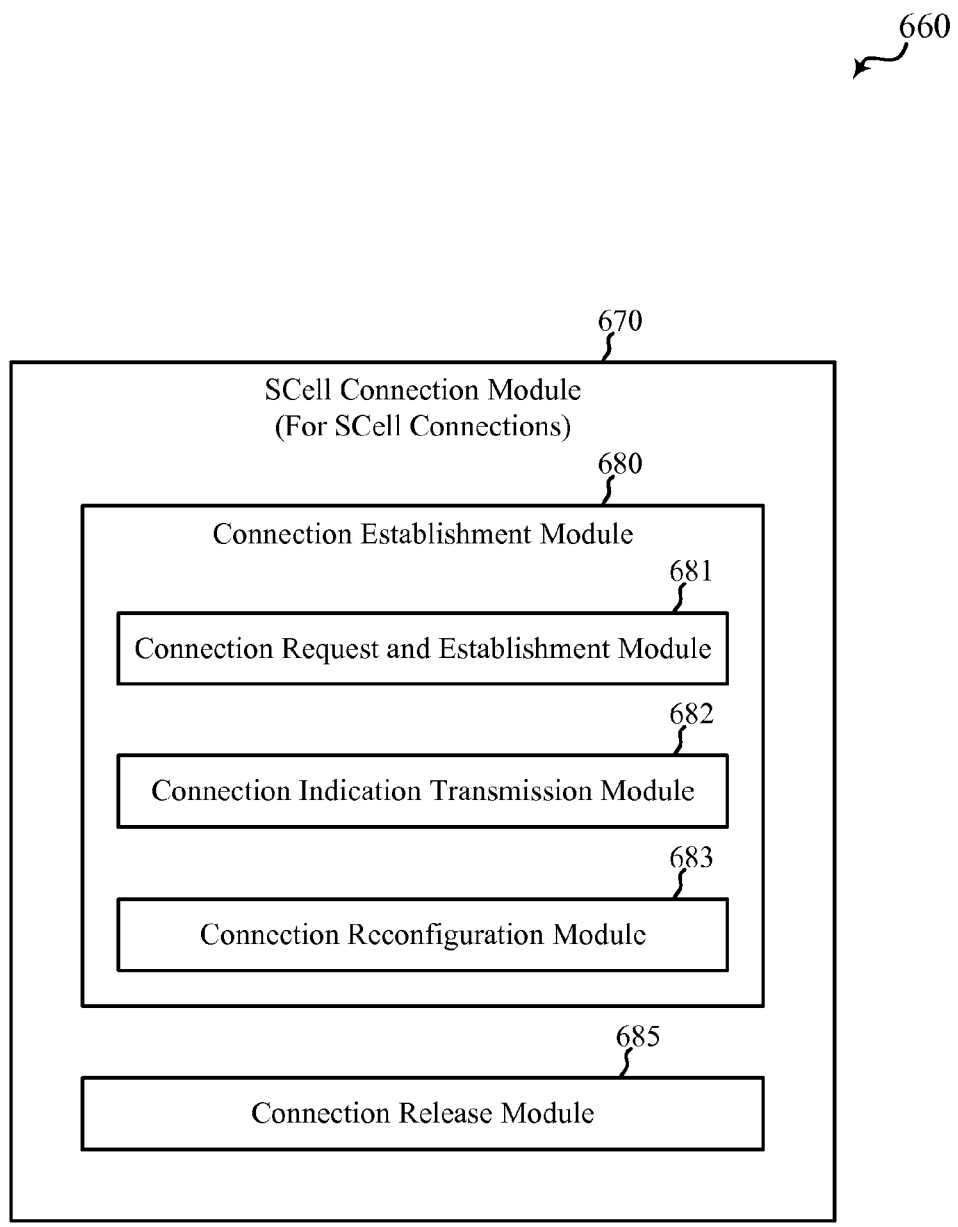
FIG. 6C is a block diagram that illustrates an example of an SCell module configured for handling aspects related to an SCell connection in accordance with various embodiments.

FIG. 6C shows a diagram 660 that includes an SCell connection module 670 for use in SCell connections. The SCell connection module 670 may include aspects of the device 500 of FIG. 5 when configured for use in an SCell to establish and/or release an SCell connection. In such cases, the SCell connection module 670 may be an example of the connection module 510 of FIG. 5. The SCell connection module 670 may include a connection establishment module 680 and a connection release module 685, which may be examples of the connection establishment module 511 and the connection release module 512 of FIG. 5, respectively.

The connection establishment module 680 may include a connection request and establishment module 681, a connection indication transmission module 682, and a connection reconfiguration module 683. The connection request and establishment module 681 may be configured to perform various functions described herein related to receiving a request from a UE to establish an independent connection. The connection indication transmission module 682 may be configured to perform various functions described herein related to transmitting an indication to a PCell that a connection between the SCell and the UE has been established. The connection reconfiguration module 683 may be configured to perform various functions described herein related to exchanging RRC configuration messages with the UE.

The connection release module 685 may be configured to perform various functions related to releasing the SCell connection in response to a determination that the SCell connection does not meet one or more performance metrics.

Figure 7:
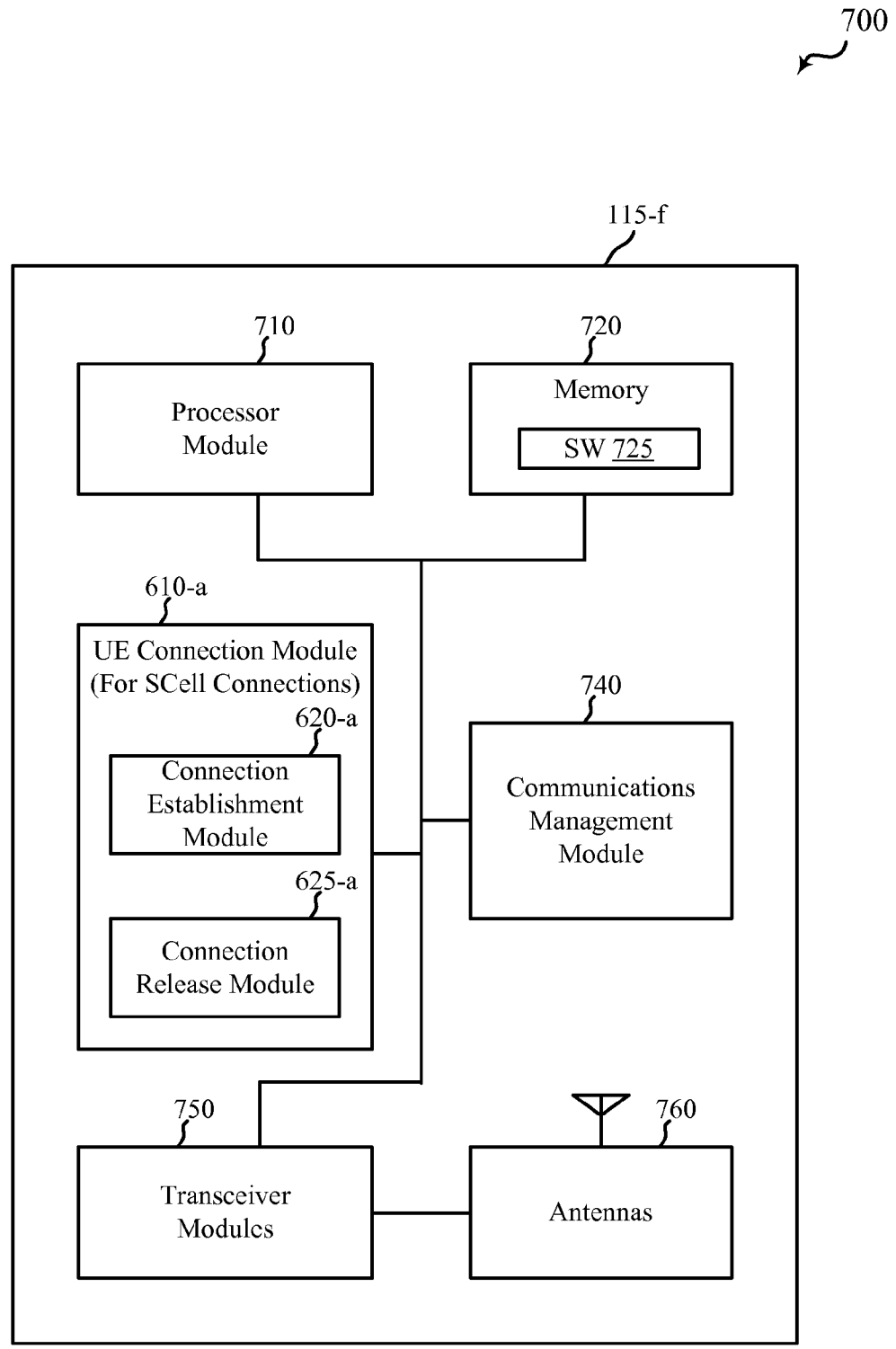
FIG. 7 is a block diagram that illustrates an example of a user equipment in accordance with various embodiments.

Turning to FIG. 7, a diagram 700 is shown that illustrates a user equipment 115-*f* configured for directly establishing one or more SCell connections (e.g., independent connections). The user equipment 115-*f* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The user equipment 115-*f* may have an internal power supply (not shown), such as a small battery, to facilitate mobile operation. The user equipment 115-*f* may be an example of the user equipment 115 of FIG. 1, FIG. 2A, FIG. 2B, FIG. 4A, FIG. 4B, FIG. 4C, and FIG. 9.

The user equipment 115-*f* may include antennas 760, a transceiver module 750, a memory 720, and a processor module 710, and a UE connection module 610-*a* for SCell connections, which each may be in communication, directly or indirectly, with each other (e.g., via one or more buses). The UE connection module 610-*a* may be configured to perform some or all of the functionality provided by the device 500 of FIG. 5 when the device is configured for use in a UE. The UE connection module 610-*a* may be an example of the UE connection module 610 of FIG. 6A. The transceiver module 750 may be configured to communicate bi-directionally, via the antennas 750 and/or one or more wired or wireless links, with one or more networks, as described above. For example, the transceiver module 750 may be configured to communicate bi-directionally with base stations 105 in FIG. 1, FIG. 2A, FIG. 2B, FIG. 8, and FIG. 9. Moreover, the transceiver module 750 may be configured to support concurrent communication with two or more non-collocated cells. The user equipment 115-*f* may communicate with other devices through one or more base stations 105. The transceiver module 750 may be implemented as one or more transmitter modules and one or more separate receiver modules. The transceiver module 750 may include a modem configured to modulate the packets and provide the modulated packets to the antennas 760 for transmission, and to demodulate packets received from the antennas 760. While the user equipment 115-*f* may include a single antenna, there may be embodiments in which the user equipment 115-*f* may include multiple antennas 760. For example, the user equipment 115-*f* may use more than one antenna to communicate with multiple non-collocated cells concurrently.

The memory 720 may include random access memory (RAM) and read-only memory (ROM). The memory 720 may store computer-readable, computer-executable software code 725 containing instructions that are configured to, when executed, cause the processor module 710 to perform various functions described herein for establishing an independent connection with an SCell. Alternatively, the software code 725 may not be directly executable by the processor module 710 but be configured to cause the computer (e.g., when compiled and executed) to perform functions described herein.

The processor module 710 may include an intelligent hardware device, e.g., a central processing unit (CPU), a microcontroller, an application-specific integrated circuit (ASIC), etc. The processor module 710 may process information received through the transceiver module 750 and/or to be sent to the transceiver module 750 for transmission through the antennas 760. The processor module 710 may handle, alone or in connection with the UE connection module 610-a, various aspects for establishing an independent connection with an SCell.

According to the architecture of FIG. 7, the user equipment 115-f may further include a communications management module 740. The communications management module 740 may manage communications with other user equipment 115 and/or with various base stations (e.g., macro cells, small cells). By way of example, the communications management module 740 may be a component of the user equipment 115-f in communication with some or all of the other components of the user equipment 115-f via a bus (as shown in FIG. 7). Alternatively, functionality of the communications management module 740 may be implemented as a component of the transceiver module 750, as a computer program product, and/or as one or more controller elements of the processor module 710.

The UE connection module 610-a may include a connection establishment module 620-a that may be an example of the connection establishment module 620 of FIG. 6A. The UE connection module 610-a may also include a connection release module 625-a that may be an example of the connection release module 625 of FIG. 6A.

The components of the user equipment 115-f may be configured to implement aspects discussed above with respect to FIG. 5 and FIG. 6A, and those aspects may not be repeated here for the sake of brevity. Moreover, the components of the user equipment 115-f may be configured to implement aspects discussed below with respect to FIG. 10, FIG. 11, and FIG. 12, and those aspects may not be repeated here also for the sake of brevity.

Figure 8:
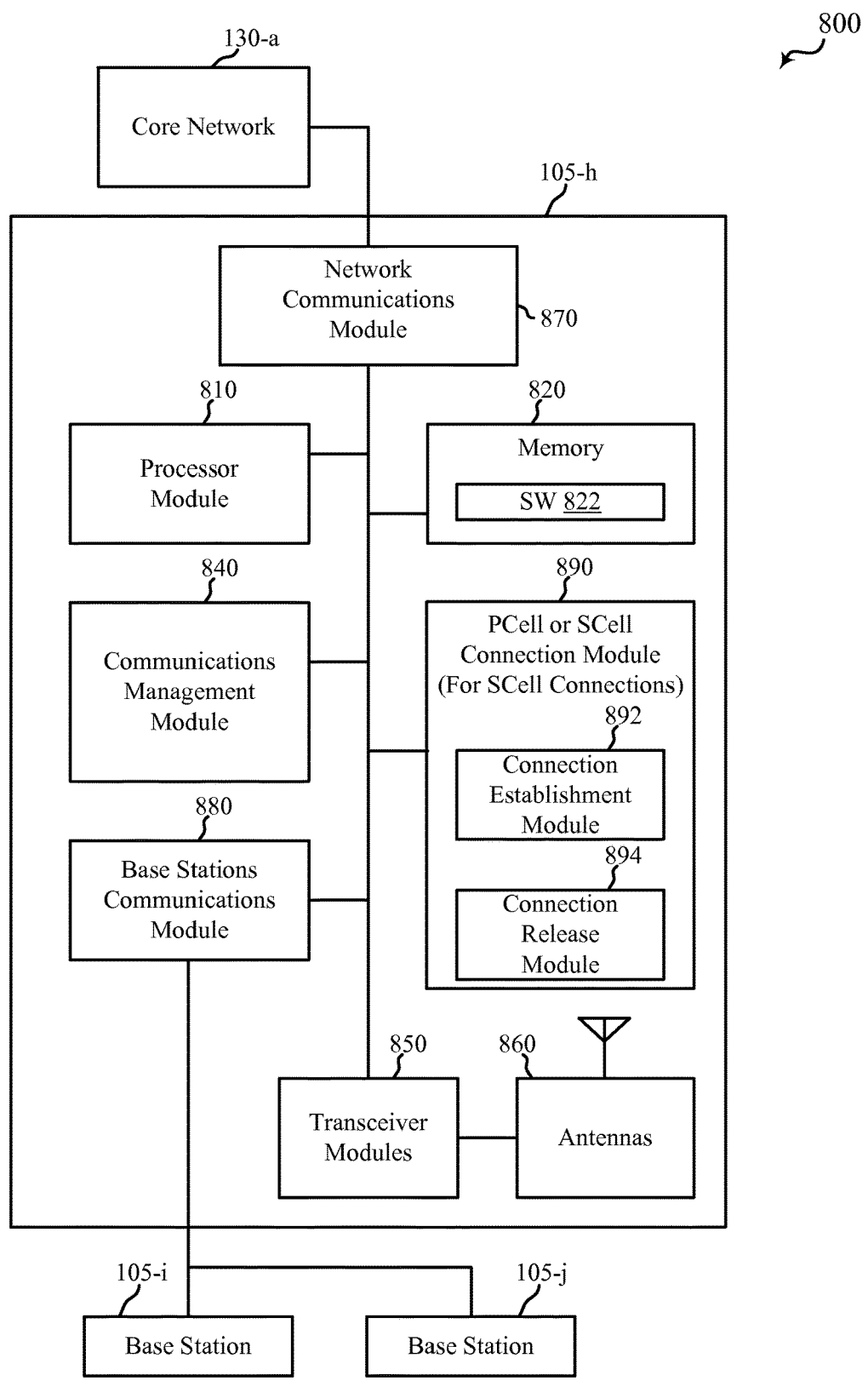
FIG. 8 is a block diagram that illustrates an example of a base station in accordance with various embodiments.

Turning to FIG. 8, a diagram 800 is shown that illustrates a base station 105-h configured for directly establishing a connection (e.g., an independent connection) between an SCell and a UE. In some embodiments, the base station 105-h may be an example of the base stations 105 of FIG. 1, FIG. 2A, FIG. 2B, and FIG. 9. In some embodiments, the base station 105-h may be an example of the PCells 210, the SCells 220 of FIG. 2A, FIG. 4A, and FIG. 4B, and/or the cells 230, 240, 250, and 260 of FIG. 2B and FIG. 4C. The base station 105-h may include antennas 860, transceiver modules 850, a memory 820, a processor module 810, and a PCell or SCell connection module 890 for SCell connections, which each may be in communication, directly or indirectly, with each other (e.g., over one or more buses). The transceiver modules 850 may be configured to communicate bi-directionally, via the antennas 860, with one or more devices illustrated in FIG. 1, FIG. 2A, and FIG. 2B for example. The transceiver modules 850 (and/or other components of the base station 105-h) may also be configured to communicate bi-directionally with one or more networks. In some cases, the base station 105-h may communicate with a core network 130-a through a network communications module 870. The core network 130-a may be an example of the core network 130 of FIG. 1.

The base station 105-h may communicate with other base stations, such as the base station 105-i and the base station 105-j, which may in turn communicate with one or more UEs. The base stations may communicate with a user equipment using different wireless communications technologies, such as different RATs. In some cases, the base station 105-h may communicate with other base stations (e.g., base stations 105-i and 105-j) using a base station communications module 880. In some embodiments, the base station communications module 880 may provide an X2 interface within an LTE wireless communication technology to provide communication between some of the base stations.

The memory 820 may include random access memory (RAM) and read-only memory (ROM). The memory 820 may also store computer-readable, computer-executable software code 822 containing instructions that are configured to, when executed, cause the processor module 810 to perform various functions described herein for establishing a connection between a UE and an SCell, for example. Alternatively, the software code 822 may not be directly executable by the processor module 810 but be configured to cause the computer, e.g., when compiled and executed, to perform functions described herein.

The processor module 810 may include an intelligent hardware device, e.g., a central processing unit (CPU), a microcontroller, an application-specific integrated circuit (ASIC), etc. The processor module 810 may process information received through the transceiver modules 850, the base station communications module 880, and/or the network communications module 870. The processor module 810 may also process information to be sent to the transceiver modules 850 for transmission through the antennas 860, to the base station communications module 880, and/or to the network communications module 870. The processor module 810 may handle, alone or in connection with the PCell or SCell connection module 890, various aspects related to establishing and/or releasing an SCell connection. When the base station 105-h corresponds to a PCell, the module 890 may be configured to perform some or all of the functionality provided by the PCell connection module 640 of FIG. 6B. On the other hand, when the base station 105-h corresponds to an SCell, the module 890 may be configured to perform some or all of the functionality provided by the SCell connection module 670 of FIG. 6C.

The transceiver modules 850 may include a modem configured to modulate the packets and provide the modulated packets to the antennas 860 for transmission, and to demodulate packets received from the antennas 860. The transceiver modules 850 may be implemented as one or more transmitter modules and one or more separate receiver modules.

According to the architecture of FIG. 8, the base station 105-h may further include a communications management module 840. The communications management module 840 may manage communications with base stations and/or other devices illustrated in the systems 100, 200, and 200-a of FIG. 1, FIG. 2A, and FIG. 2B. By way of example, the communications management module 840 may be a component of the base station 105-h in communication with some or all of the other components of the base station 105-h via a bus (as shown in FIG. 8). Alternatively, functionality of the communications management module 840 may be implemented as a component of the transceiver modules 850, as a computer program product, and/or as one or more controller elements of the processor module 810.

The PCell or SCell connection module 890 may include a connection establishment module 892 that may be an example of the connection establishment module 650 of FIG. 6B when the base station 105-h corresponds to a PCell. Or, the connection establishment module 892 may be an example of the connection establishment module 680 of FIG. 6C when the base station 105-h corresponds to an SCell. The PCell or SCell connection module 890 may also include a connection release module 894 that may be an example of the connection release module 655 of FIG. 6B when the base station 105-*h* corresponds to a PCell. Alternatively, the connection release module 894 may be an example of the connection release module 685 of FIG. 6C when the base station 105-*h* corresponds to an SCell.

The components of the base station 105-*h* may be configured to implement aspects discussed above with respect FIG. 5, FIG. 6B, and FIG. 6C, and those aspects may not be repeated here for the sake of brevity. Moreover, the components of the base station 105-*h* may be configured to implement aspects discussed below with respect to FIG. 13, FIG. 14, FIG. 15, and FIG. 16 and those aspects may not be repeated here also for the sake of brevity.

Figure 9:
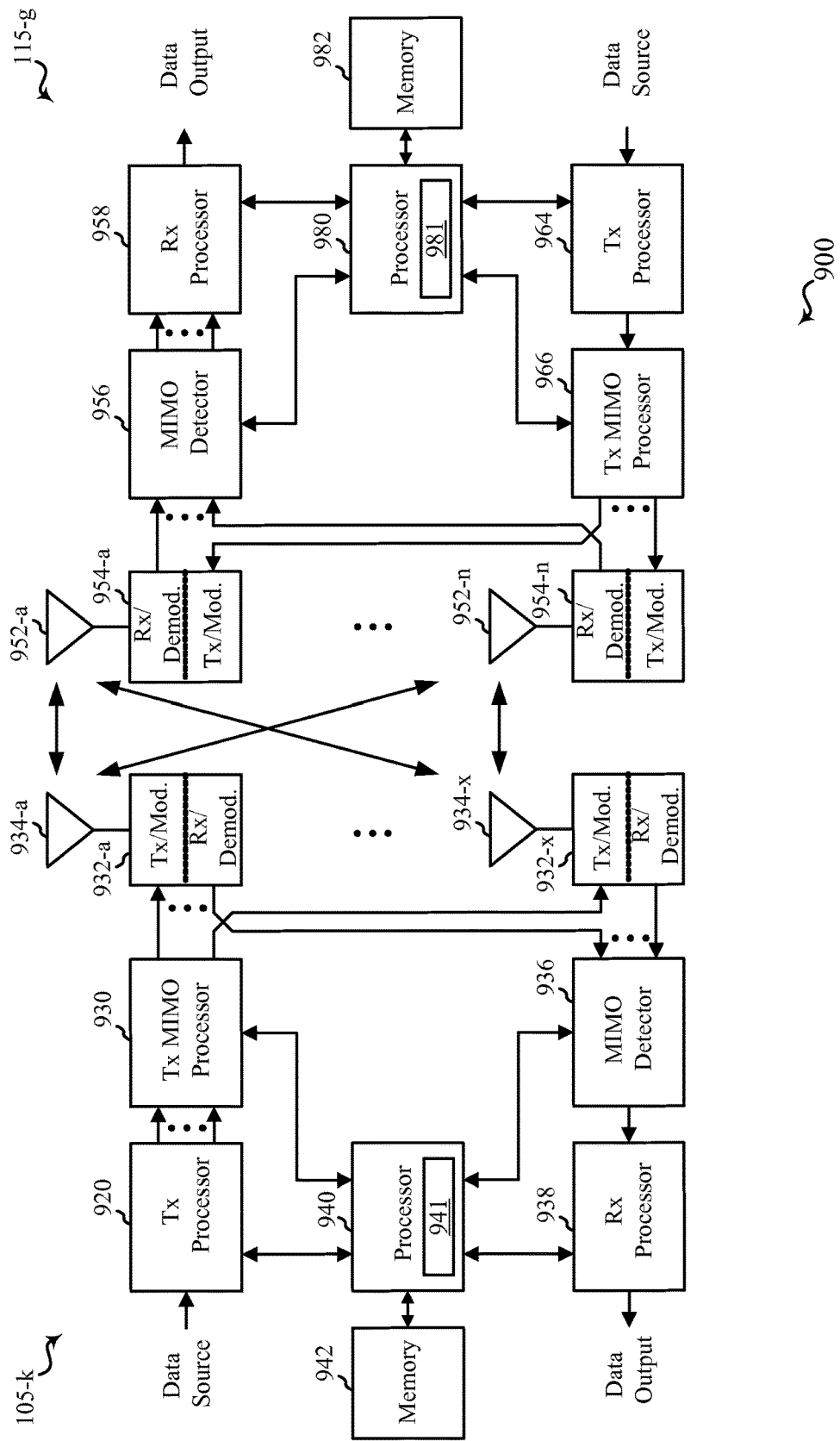
FIG. 9 is a block diagram of a MIMO communication system including a base station and a user equipment in accordance with various embodiments.

Turning next to FIG. 9, a block diagram of a multiple-input multiple-output (MIMO) communication system 900 is shown including a base station 105-*k* and a user equipment or UE 115-*g*. The user equipment 115-*g* may support concurrent communication with multiple cells. The base station 105-*k* may be an example of the base stations 105 of FIG. 1, FIG. 2A, FIG. 2B, and FIG. 8, while the user equipment 115-*g* may be an example of the user equipment 115 of FIG. 1, FIG. 2A, FIG. 2B, FIG. 4A, FIG. 4B, FIG. 4C, and FIG. 7. The system 900 may illustrate aspects of the system 100 of FIG. 1, aspects of the system 200 of FIG. 2A, and aspects of the system 200-*a* of FIG. 2B.

The base station 105-*k* may be equipped with antennas 934-*a* through 934-*x*, and the user equipment 115-*g* may be equipped with antennas 952-*a* through 952-*n*. In the system 900, the base station 105-*k* may be able to send data over multiple communication links at the same time. Each communication link may be called a "layer" and the "rank" of the communication link may indicate the number of layers used for communication. For example, in a 2×2 MIMO system where base station 800 transmits two "layers," the rank of the communication link between the base station 105-*k* and the user equipment 115-*g* is two.

At the base station 105-*k*, a transmit (Tx) processor 920 may receive data from a data source. The transmit processor 920 may process the data. The transmit processor 920 may also generate reference symbols, and a cell-specific reference signal. A transmit (Tx) MIMO processor 930 may perform spatial processing (e.g., precoding) on data symbols, control symbols, and/or reference symbols, if applicable, and may provide output symbol streams to the transmit modulators 932-*a* through 932-*x*. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink (DL) signal. In one example, DL signals from modulators 932-*a* through 932-*x* may be transmitted via the antennas 934-*a* through 934-*x*, respectively.

At the user equipment 115-*g*, the antennas 952-*a* through 952-*n* may receive the DL signals from the base station 105-*k* and may provide the received signals to the demodulators 954-*a* through 954-*n*, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954-*a* through 954-*n*, perform MIMO detection on the received symbols if applicable, and provide detected symbols. A receive (Rx) processor 958 may process (e.g., demodulate, deinterleave, and decode) the detected symbols, providing decoded data for the user equipment 115-*g* to a data output, and provide decoded control information to a processor 980, or memory 982. The processor 980 may include a module or function 981 that may perform various functions related to establishing an SCell connection. For example, the module or function 981 may perform some or all of the functions described above with reference to the device 500 of FIG. 5 when configured for use in a UE, and/or the UE connection modules 610 and 610-*a* of FIG. 6A and FIG. 7, respectively.

On the uplink (UL), at the user equipment 115-*g*, a transmit (Tx) processor 964 may receive and process data from a data source. The transmit processor 964 may also generate reference symbols for a reference signal. The symbols from the transmit processor 964 may be precoded by a transmit (Tx) MIMO processor 966 if applicable, further processed by the demodulators 954-*a* through 954-*n* (e.g., for SC-FDMA, etc.), and be transmitted to the base station 105-*k* in accordance with the transmission parameters received from the base station 105-*k*. At the base station 105-*k*, the UL signals from the user equipment 115-*g* may be received by the antennas 934, processed by the demodulators 932, detected by a MIMO detector 936 if applicable, and further processed by a receive processor. The receive (Rx) processor 938 may provide decoded data to a data output and to the processor 940. The processor 940 may include a module or function 941 that may be related to establishing an SCell connection. For example, the module or function 941 may perform some or all of the functions described above with reference to the device 500 of FIG. 5 when configured for use in a PCell or an SCell, the PCell connection module 640 of FIG. 6B, the SCell connection module 670 of FIG. 6C, and/or the PCell or SCell connection module 890 of FIG. 8. Additionally or alternatively, the processor may be in electronic communication with memory 942 which may contain instructions executable by the processor 940 to perform some or all of the functions described herein.

The components of the base station 105-*k* may, individually or collectively, be implemented with one or more Application Specific Integrated Circuits (ASICs) adapted to perform some or all of the applicable functions in hardware. Each of the noted modules may be a means for performing one or more functions related to operation of the system 900. Similarly, the components of the user equipment 115-*g* may, individually or collectively, be implemented with one or more Application Specific Integrated Circuits (ASICs) adapted to perform some or all of the applicable functions in hardware. Each of the noted components may be a means for performing one or more functions related to operation of the system 900.

Figure 10:
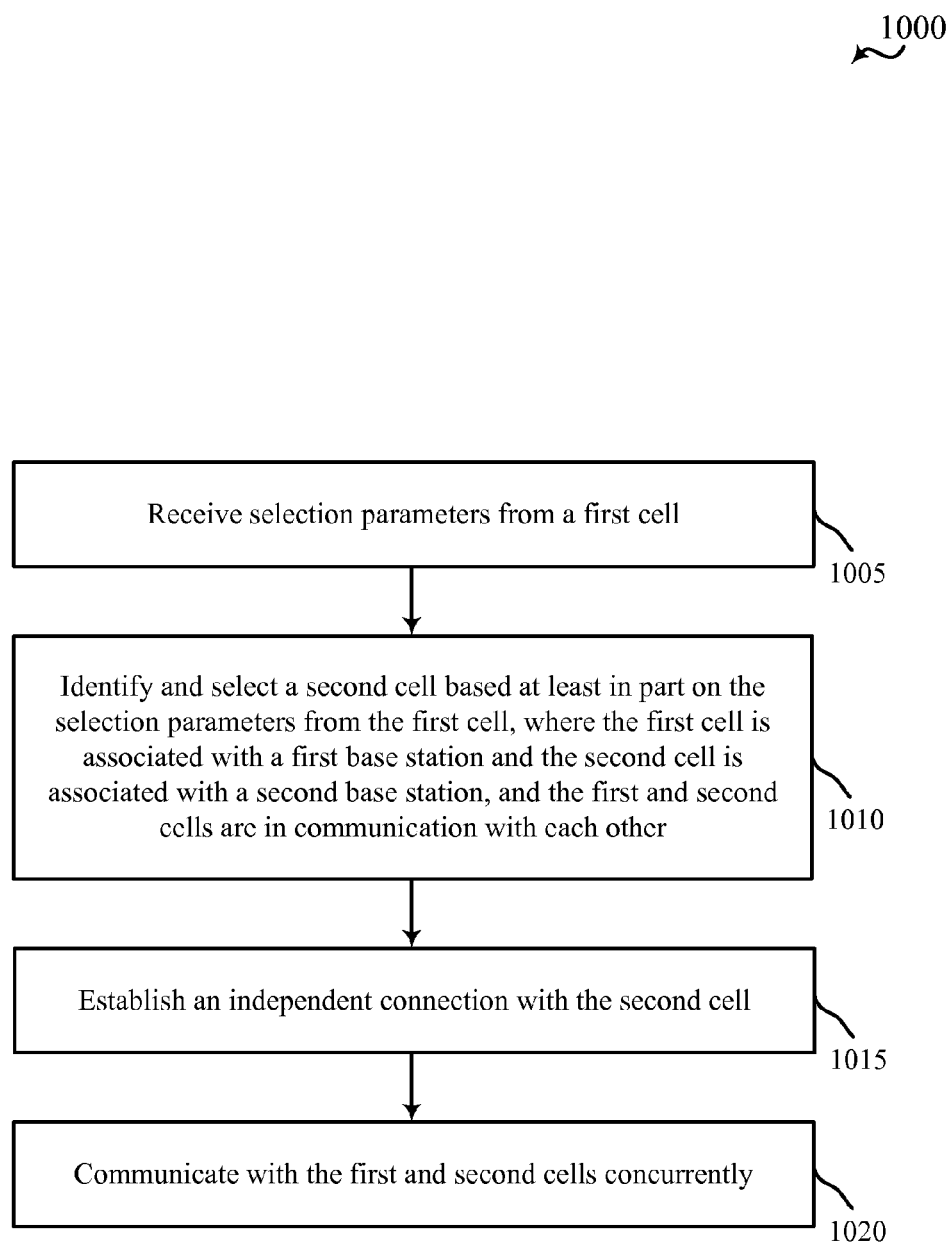
FIG. 10 is a flow diagram of an example of a method for establishing an SCell connection by a wireless device in accordance with various embodiments.

Turning next to FIG. 10, a flow diagram of a method 1000 for establishing an SCell connection by a wireless device in a wireless communications system is provided in accordance with various embodiments. The method 1000 may be implemented using, for example, the user equipment 115 of FIG. 1, FIG. 2A, FIG. 2B, FIG. 4A, FIG. 4B, FIG. 4C, FIG. 7, and FIG. 9; the device 500 of FIG. 5; the UE connection modules 610 of FIG. 6A and FIG. 7; and/or the systems 100, 200, and 200-*a* of FIG. 1, FIG. 2A, and FIG. 2B, respectively.

At block 1005, a wireless device (e.g., UE 115) receives selection parameters from a first cell (e.g., PCells 210, 210-*a*, cells 230, 240, 250, 260, 230-*a*, 240-*a*, 250-*a*, 260-*a*). At block 1010, the wireless device identifies and selects a second cell (e.g., SCells 220, 220-*a*, cells 230, 240, 250, 260, 230-*a*, 240-*a*, 250-*a*, 260-*a*) based at least in part on the selection parameters from the first cell. The first cell may be associated with a first base station and the second cell may be associated with a second base station such that the first and second cells are not collocated. Moreover, the first and second cells are in communication with each other allowing multiple flows of data (i.e., multiflow) to the wireless device. At block 1015, the wireless device establishes an independent connection with the second cell. At block 1020, the wireless device communicates with the first and second cells concurrently.

In some embodiments of the method 1000, receiving selection parameters from the first cell includes receiving a set of candidate cells from which to select the second cell. A radio access technology of the second cell may be different from a RAT of the first cell. The set of candidate cell may include cells of a plurality of radio access technologies (RATs). Each candidate cell in the set may be identified by at least one of a cell identifier, a global cell identifier, a tracking area code, a carrier frequency, a location area code, a routing area code, a service set identifier (SSID), a basic service set identifier (BSSID), or a homogenous extended service set identifier (HESSID). In some embodiments, the selection parameters received from the first cell include at least one of a reference signal receive power, a reference signal receive quality, a wireless local area network (WLAN) load, a basic service set (BSS) load, or a wide area network (WAN) metric.

In some embodiments of the method 1000, the method includes determining a parameter associated with each candidate cell in the set, and selecting the second cell from the set based at least in part on the determined parameter associated with the second cell.

In some embodiments of the method 1000, communicating with the first and second cells concurrently includes communicating with the first cell using a first component carrier, and communicating with the second cell using a second component carrier.

In some embodiments of the method 1000, establishing an independent connection with the second cell includes transmitting an initial access message to the second cell, and receiving a response message from the second cell responsive to the initial access message.

In some embodiments of the method 1000, the method includes receiving from the first cell an indication that the wireless device is permitted to establish the independent connection with the second cell.

In some embodiments of the method 1000, the method includes determining whether an amount of uplink data in a buffer is above a threshold value, and establishing the independent connection with the second cell when the amount of uplink data in the buffer is above the threshold value. In some embodiments, the method includes detecting whether there is available uplink data, and establishing the independent connection with the second cell when available uplink data is detected. The available uplink data may be associated with selected one or more of a quality of service and a bearer identifier. In some embodiments, the independent connection is established with the second cell based at least in part on the type of application associated with the uplink data detected.

In some embodiments of the method 1000, the method includes detecting whether there is available downlink data, and establishing the independent connection with the second cell when available downlink data is detected. The downlink data may be associated with selected one or more of a quality of service; and a bearer identifier. In some embodiments, the independent connection is established with the second cell based at least in part on the type of application associated with the downlink data detected.

In some embodiments of the method 1000, the method includes receiving a cell load indication from the first cell, and establishing the independent connection with the second cell based at least in part on the cell load indication received from the first cell. In some embodiments, the method includes receiving a cell load indication from the second cell, and selecting the second cell based at least in part on the cell load indication received from the second cell.

In some embodiments of the method 1000, communicating with the first and second cells concurrently includes communicating with the first cell according to a first scheduler associated with the first cell while communicating concurrently with the second cell according to a second scheduler associated with the second cell.

Figure 11:
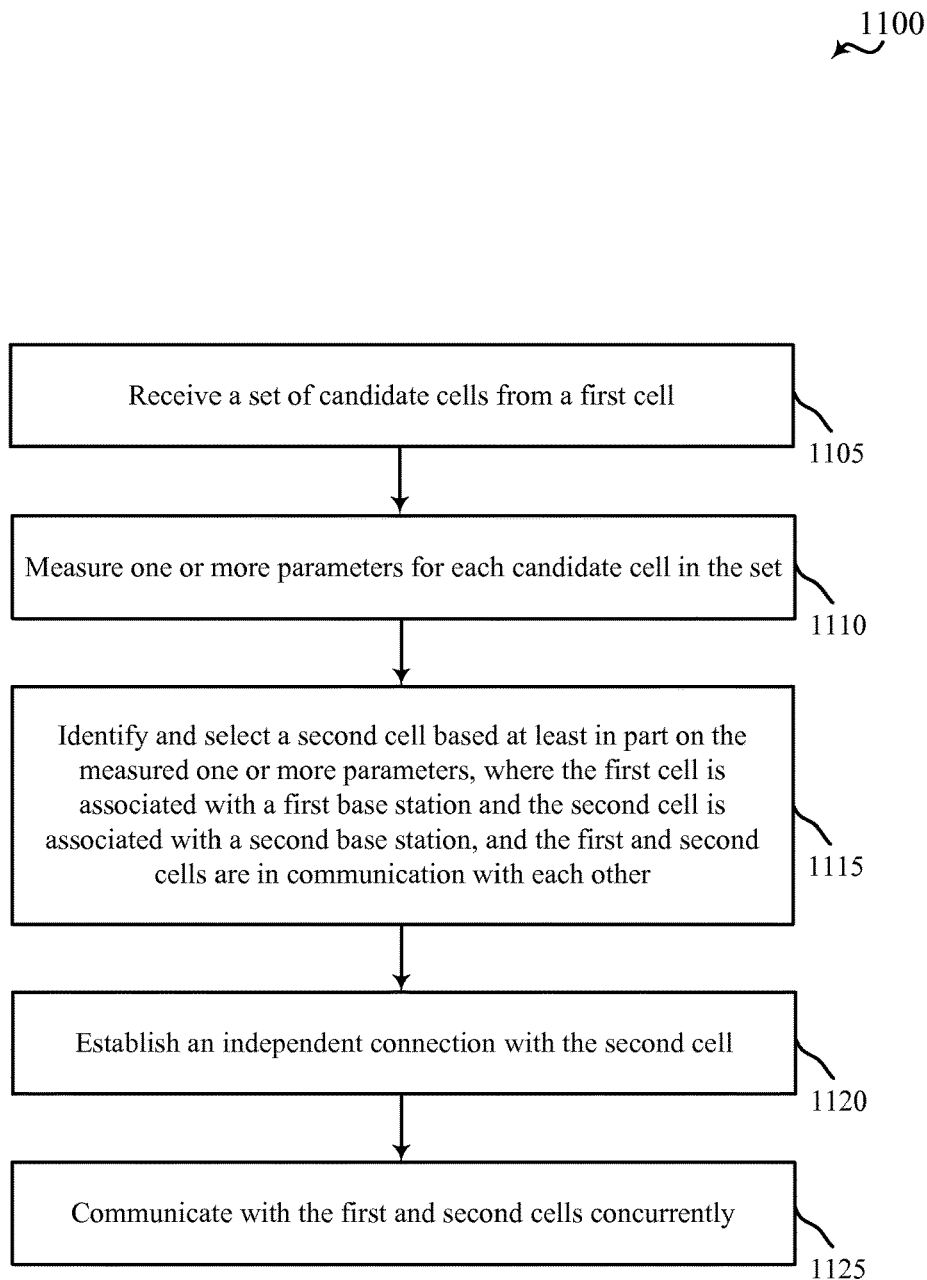
FIG. 11 is a flow diagram of another example of a method for establishing an SCell connection by a wireless device in accordance with various embodiments.

Turning to FIG. 11, a flow diagram of a method 1100 for establishing an SCell connection by a wireless device in a wireless communications system is provided in accordance with various embodiments. The method 1100, like the method 1000 above, may be implemented using, for example, the user equipment 115 of FIG. 1, FIG. 2A, FIG. 2B, FIG. 4A, FIG. 4B, FIG. 4C, FIG. 7, and FIG. 9; the device 500 of FIG. 5; the UE connection modules 610 of FIG. 6A and FIG. 7; and/or the systems 100, 200, and 200-*a* of FIG. 1, FIG. 2A, and FIG. 2B, respectively.

At block 1105, a wireless device (e.g., UE 115) receives a set of candidate cells from a first cell (e.g., PCells 210, 210-*a*, cells 230, 240, 250, 260, 230-*a*, 240-*a*, 250-*a*, 260-*a*). At block 1110, the wireless device measures one or more parameters (e.g., RSRP, RSRQ) for each candidate cell in the set. At block 1115, the wireless device identifies and selects a second cell (e.g., SCells 220, 220-*a*, cells 230, 240, 250, 260, 230-*a*, 240-*a*, 250-*a*, 260-*a*) based at least in part on the measured one or more parameters. The first cell is associated with a first base station and the second cell is associated with a second base station. Moreover, the first and second cells are in communication with each other. At block 1120, the wireless device establishes an independent connection with the second cell. At block 1125, the wireless device communicates with the first and second cells concurrently.

Figure 12:
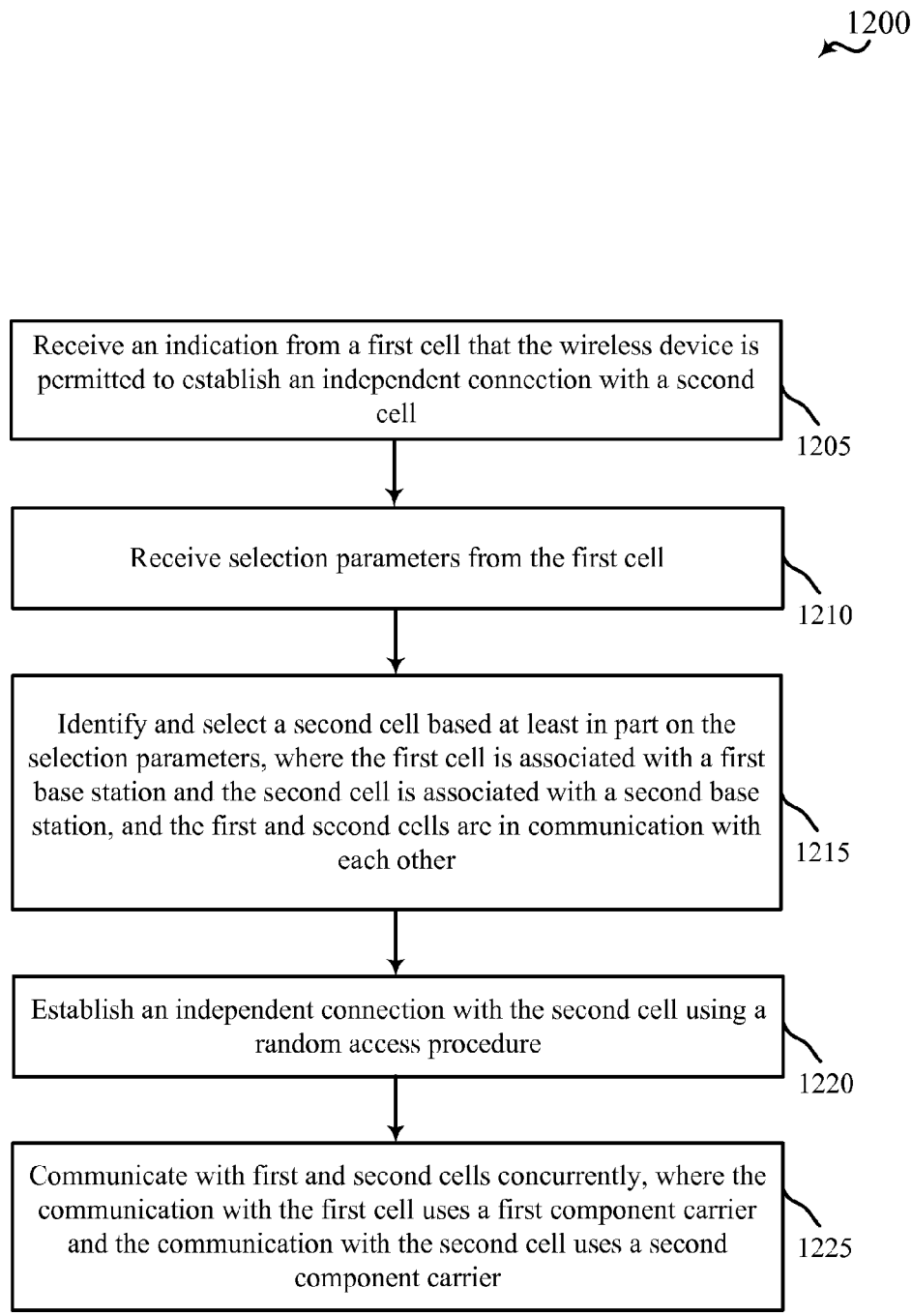
FIG. 12 is a flow diagram of yet another example of a method for establishing an SCell connection by a wireless device in accordance with various embodiments.

Turning to FIG. 12, a flow diagram of a method 1200 for establishing an SCell connection by a wireless device in a wireless communications system is provided in accordance with various embodiments. The method 1200, like the methods 1000 and 1100 above, may be implemented using, for example, the user equipment 115 of FIG. 1, FIG. 2A, FIG. 2B, FIG. 4A, FIG. 4B, FIG. 4C, FIG. 7, and FIG. 9; the device 500 of FIG. 5; the UE connection modules 610 of FIG. 6A and FIG. 7; and/or the systems 100, 200, and 200-*a* of FIG. 1, FIG. 2A, and FIG. 2B, respectively.

At block 1205, a wireless device (e.g., UE 115) receives an indication from a first cell (e.g., PCells 210, 210-*a*, cells 230, 240, 250, 260, 230-*a*, 240-*a*, 250-*a*, 260-*a*) that the wireless device is permitted to establish an independent connection with a second cell (e.g., SCells 220, 220-*a*, cells 230, 240, 250, 260, 230-*a*, 240-*a*, 250-*a*, 260-*a*). At block 1210, the wireless device receives selection parameters from the first cell. At block 1215, the wireless device identifies and selects the second cell based at least in part on the selection parameters. The first cell is associated with a first base station and the second cell is associated with a second base station. Moreover, the first and second cells are in communication with each other. At block 1220, the wireless device establishes an independent connection with the second cell using a random access procedure. At block 1225, the wireless device communicates with the first and second cells concurrently, where the communication with the first cell uses a first component carrier and the communication with the second cell uses a second component carrier.

Figure 13:
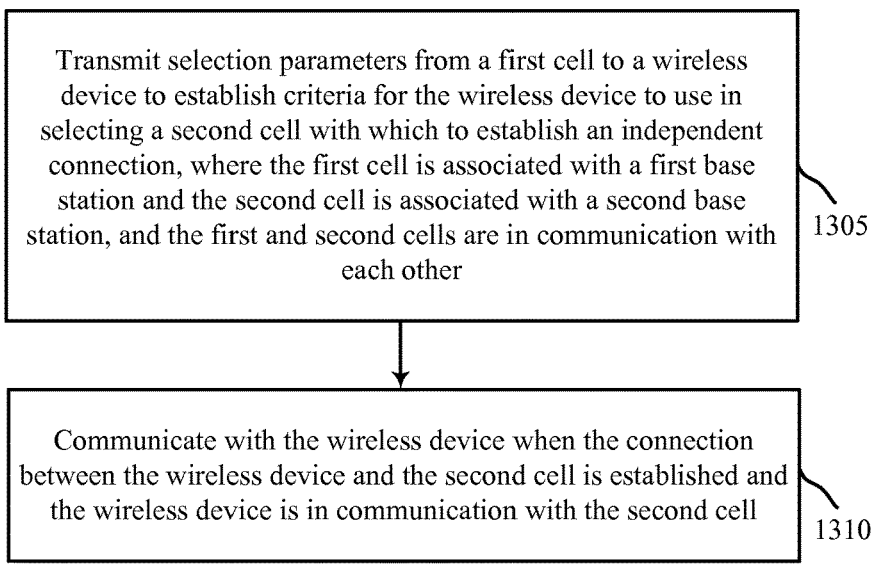
FIG. 13 is a flow diagram of an example of a method for aspects of a PCell related to establishing an SCell connection in accordance with various embodiments.

Turning next to FIG. 13, a flow diagram of a method 1300 describing aspects of a PCell related to establishing an SCell connection in a wireless communications system is provided in accordance with various embodiments. The method 1300 may be implemented using, for example, the base stations 105 of FIG. 1, FIG. 2A, FIG. 2B, FIG. 8, and FIG. 9; the PCells 210 of FIG. 2A, FIG. 4A, and FIG. 4B; the device 500 of FIG. 5; the PCell connection module 640 of FIG. 6B; the module 890 of FIG. 8; and/or the systems 100, 200, and 200-a of FIG. 1, FIG. 2A, and FIG. 2B, respectively.

At block 1305, a first cell (e.g., PCells 210, 210-a) transmits selection parameters to a wireless device (e.g., UE 115) to establish criteria for the wireless device to use in selecting a second cell (e.g., SCells 220, 220-a, cells 230, 240, 250, 260, 230-a, 240-a, 250-a, 260-a) with which to establish an independent connection. The first cell is associated with a first base station and the second cell is associated with a second base station. Moreover, the first and second cells are in communication with each.

At block 1310, the first cell communicates with the wireless device when the connection between the wireless device and the second cell is established and the wireless device is in communication with the second cell.

Figure 14:
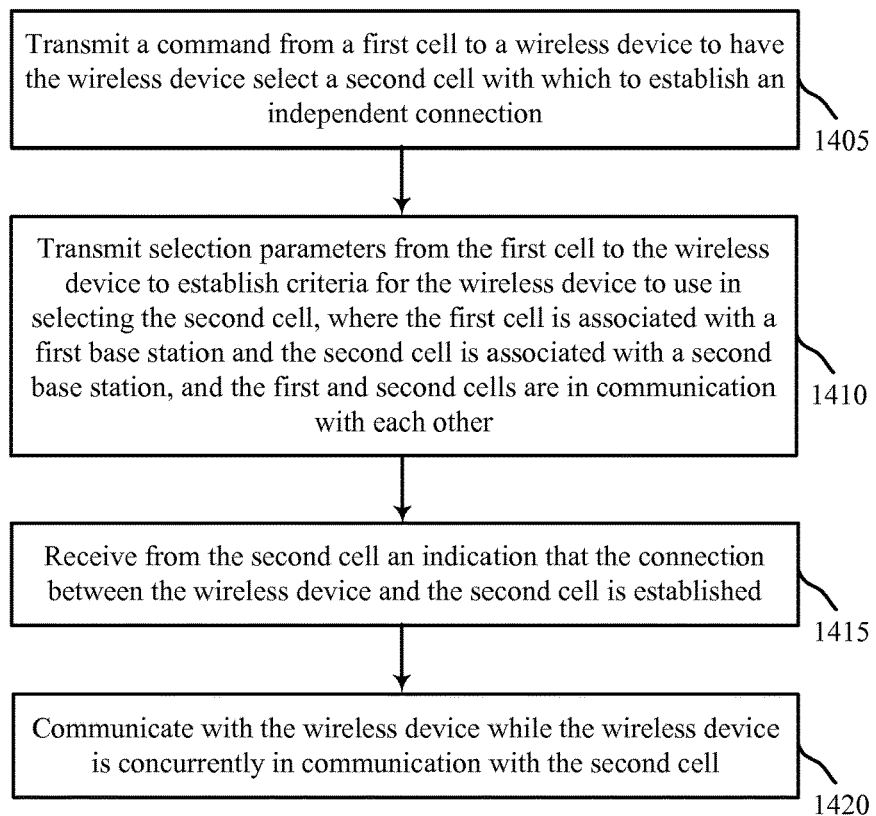
FIG. 14 is a flow diagram of another example of a method for aspects of a PCell related to establishing an SCell connection by a PCell in accordance with various embodiments.

Turning to FIG. 14, a flow diagram of a method 1400 describing aspects of a PCell related to establishing an SCell connection in a wireless communications system is provided in accordance with various embodiments. The method 1400, like the method 1300 above, may be implemented using, for example, the base stations 105 of FIG. 1, FIG. 2A, FIG. 2B, FIG. 8, and FIG. 9; the PCells 210 of FIG. 2A, FIG. 4A, and FIG. 4B; the device 500 of FIG. 5; the PCell connection module 640 of FIG. 6B; the module 890 of FIG. 8; and/or the systems 100, 200, and 200-a of FIG. 1, FIG. 2A, and FIG. 2B, respectively.

At block 1405, a first cell (e.g., PCells 210, 210-a) transmits a command to a wireless device (e.g., UE 115) to have the wireless device select (e.g., autonomously select) a second cell (e.g., SCells 220, 220-a, cells 230, 240, 250, 260, 230-a, 240-a, 250-a, 260-a) with which to establish an independent connection. At block 1410, the first cell transmits selection parameters to the wireless device to establish criteria for the wireless device to use in selecting the second cell. The first cell is associated with a first base station and the second cell is associated with a second base station. Moreover, the first and second cells are in communication with each.

At block 1415, the first cell receives from the second cell an indication that the connection between the wireless device and the second cell is established. At block 1420, the first cell communicates with the wireless device while the wireless device is concurrently in communication with the second cell.

Figure 15:
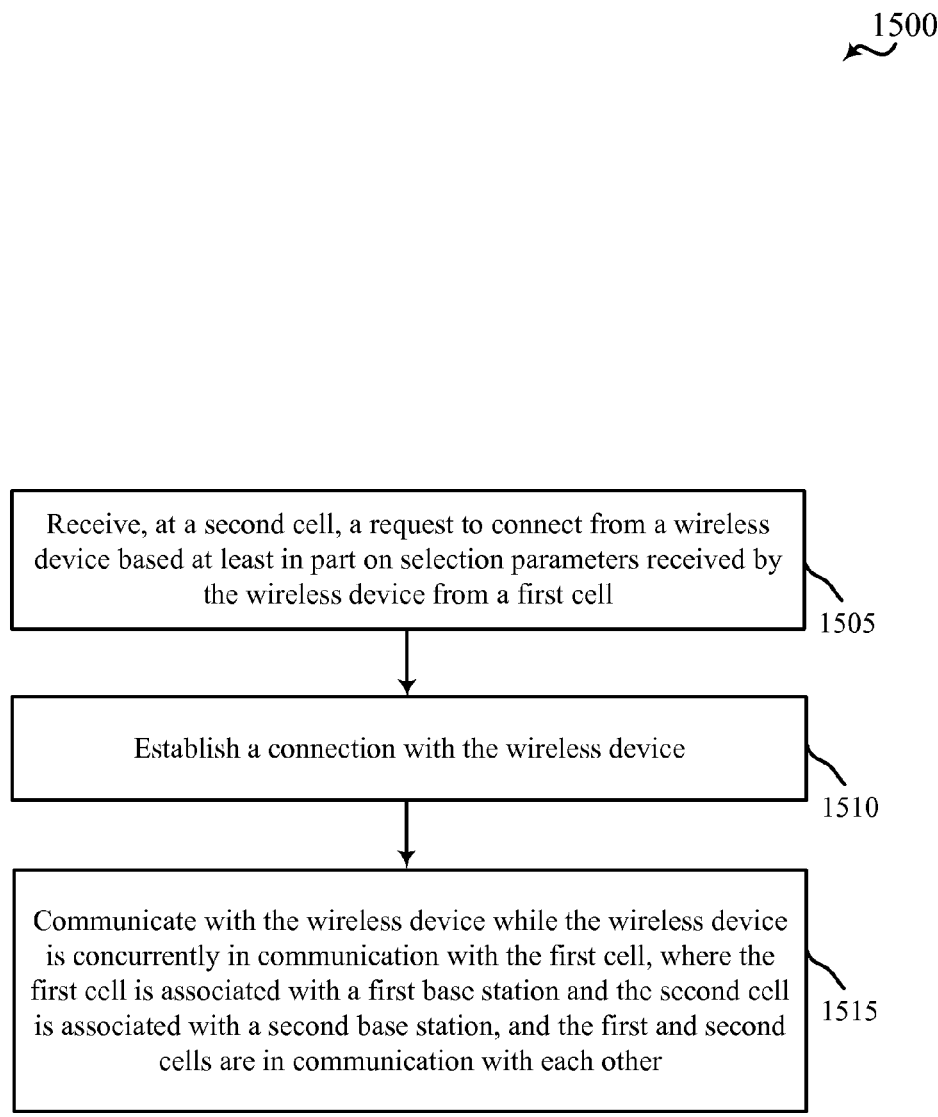
FIG. 15 is a flow diagram of an example of a method for handling aspects related to establishing an SCell connection by the SCell in accordance with various embodiments.

Turning next to FIG. 15, a flow diagram of a method 1500 for establishing an SCell connection by an SCell in a wireless communications system is provided in accordance with various embodiments. The method 1500 may be implemented using, for example, the base stations 105 of FIG. 1, FIG. 2A, FIG. 2B, FIG. 8, and FIG. 9; the SCells 220 of FIG. 2A, FIG. 4A, and FIG. 4B; the cells 230, 240, 250, and 260 of FIG. 2B and FIG. 4C; the device 500 of FIG. 5; the SCell connection module 670 of FIG. 6C; the module 890 of FIG. 8; and/or the systems 100, 200, and 200-a of FIG. 1, FIG. 2A, and FIG. 2B, respectively.

At block 1505, a second cell (e.g., SCells 220, 220-a, cells 230, 240, 250, 260, 230-a, 240-a, 250-a, 260-a) receives a request to connect from a wireless device (e.g., UE 115) based at least in part on selection parameters received by the wireless device from a first cell (e.g., PCells 210, 210-a, cells 230, 240, 250, 260, 230-a, 240-a, 250-a, 260-a). At block 1510, the second cell establishes a connection with the wireless device. At block 1515, the second cell communicates with the wireless device while the first cell is concurrently in communication with the wireless device. The first cell is associated with a first base station and the second cell is associated with a second base station. Moreover, the first and second cells are in communication with each.

Figure 16:
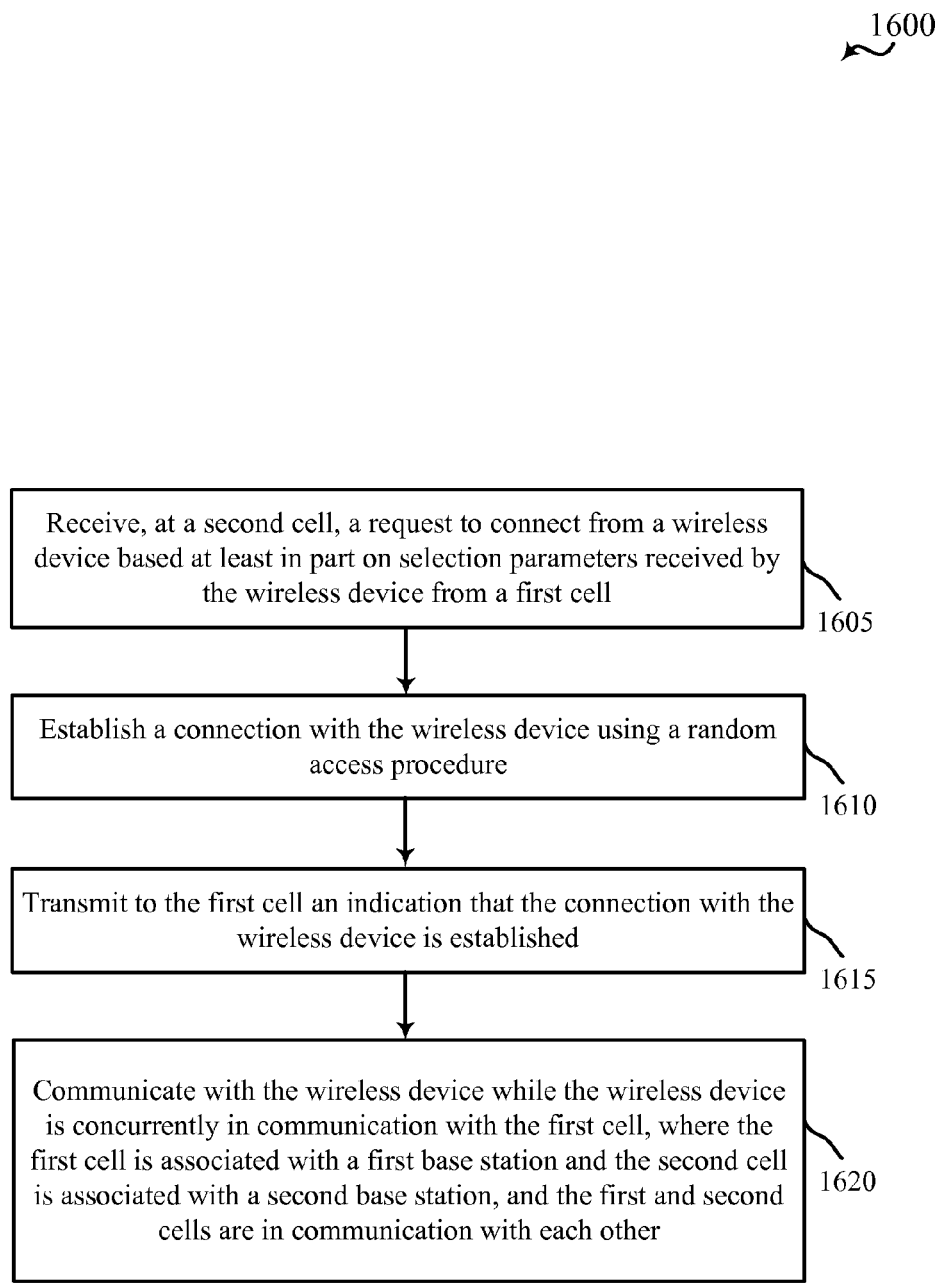
FIG. 16 is a flow diagram of another example of a method for handling aspects related to establishing an SCell connection by the SCell in accordance with various embodiments.

Turning to FIG. 16, a flow diagram of a method 1600 for establishing an SCell connection by an SCell in a wireless communications system is provided in accordance with various embodiments. The method 1600, like the method 1500 above, may be implemented using, for example, the base stations 105 of FIG. 1, FIG. 2A, FIG. 2B, FIG. 8, and FIG. 9; the SCells 220 of FIG. 2A, FIG. 4A, and FIG. 4B; the cells 230, 240, 250, and 260 of FIG. 2B and FIG. 4C; the device 500 of FIG. 5; the SCell connection module 670 of FIG. 6C; the module 890 of FIG. 8; and/or the systems 100, 200, and 200-a of FIG. 1, FIG. 2A, and FIG. 2B, respectively.

At block 1605, a second cell (e.g., SCells 220, 220-a, cells 230, 240, 250, 260, 230-a, 240-a, 250-a, 260-a) receives a request to connect from a wireless device (e.g., UE 115) based at least in part on selection parameters received by the wireless device from a first cell (e.g., PCells 210, 210-a, cells 230, 240, 250, 260, 230-a, 240-a, 250-a, 260-a). At block 1610, the second cell establishes a connection with the wireless device. At block 1615, the second cell transmits to the first cell an indication that the connection with the wireless device is established. At block 1620, the second cell communicates with the wireless device while the first cell is concurrently in communication with the wireless device. The first cell is associated with a first base station and the second cell is associated with a second base station. Moreover, the first and second cells are in communication with each.

The detailed description set forth above in connection with the appended drawings describes example embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications by a wireless device, comprising:
   receiving selection parameters from a first cell, the selection parameters including one or more attributes;
   measuring the one or more attributes of a plurality of candidate cells based at least in part on the selection parameters received from the first cell, wherein the measured attributes comprise transmission rank and at least one of reference signal receive power or reference signal receive quality;
   identifying a second cell from the plurality of candidate cells based at least in part on the selection parameters and the one or more measured attributes and without additional direction from the first cell, the first cell being associated with a first base station and the second cell being associated with a second base station, and the first and the second cells being in communication with each other;
   determining that an amount of uplink data in a buffer is above a threshold value;
   transmitting, by the wireless device, an initial access message directly to the second cell to establish an independent connection with the second cell based at least in part on identifying the second cell from the plurality of candidate cells and determining that the amount of uplink data in the buffer is above the threshold;
   receiving a response message from the second cell without direction from the first cell, wherein the response message is responsive to the initial access message; and
   communicating with the first and second cells concurrently using the independent connection with the second cell that is established based at least in part on the receiving the response message from the second cell.

2. The method of claim 1, wherein receiving the selection parameters from the first cell comprises:
   receiving a set of candidate cells from which to select the second cell.

3. The method of claim 2, wherein the set of candidate cells comprises cells of a plurality of radio access technologies (RATs), wherein at least one RAT is different than the other RATs.

4. The method of claim 2, wherein each candidate cell in the set is identified by at least one of:
   a cell identifier;
   a global cell identifier;
   a tracking area code;
   a carrier frequency;
   a location area code;
   a routing area code;
   a service set identifier (SSID);
   a basic service set identifier (BSSID); or
   a homogenous extended service set identifier (HESSID).

5. The method of claim 1, wherein a radio access technology (RAT) of the second cell is different from a RAT of the first cell.

6. The method of claim 1, wherein the first and second cells being in communication with each other comprises being in communication via a backhaul link.

7. The method of claim 1, wherein the selection parameters received from the first cell further comprise at least one of:
   a wireless local area network (WLAN) load;
   a basic service set (BSS) load; or
   a wide area network (WAN) metric.

8. The method of claim 1, wherein communicating with the first and second cells concurrently comprises:

communicating with the first cell using a first component carrier; and
communicating with the second cell using a second component carrier.

9. The method of claim 1, wherein receiving the selection parameters further comprises:
receiving, from the first cell, an indication that the wireless device is permitted to establish the independent connection with the second cell, wherein the indication includes the selection parameters.

10. The method of claim 1, wherein identifying the second cell further comprises:
determining a parameter associated with each candidate cell in a set of candidate cells; and
selecting the second cell from the set based at least in part on the parameter associated with the second cell.

11. The method of claim 1, wherein the data in the buffer is uplink data; and wherein determining that the amount of data exceeds the threshold value comprises:
detecting whether there is available uplink data, wherein the independent connection with the second cell is established based at least in part on available uplink data being detected.

12. The method of claim 11, wherein the independent connection is established with the second cell based at least in part on a type of application associated with the uplink data.

13. The method of claim 1, further comprising:
detecting whether there is available downlink data, wherein the independent connection with the second cell is established further based at least in part on available downlink data being detected.

14. The method of claim 13, wherein the independent connection is established with the second cell further based at least in part on a type of application associated with the downlink data.

15. The method of claim 1, further comprising:
receiving a cell load indication from the first cell; and
establishing the independent connection with the second cell based at least in part on the cell load indication received from the first cell.

16. The method of claim 1, further comprising:
receiving a cell load indication from the second cell; and
selecting the second cell based at least in part on the cell load indication received from the second cell.

17. The method of claim 1, wherein communicating with the first and second cells concurrently comprises:
communicating with the first cell according to a first scheduler associated with the first cell while communicating concurrently with the second cell according to a second scheduler associated with the second cell.

18. A device for wireless communications, comprising:
a processor; and
a memory in electronic communication with the processor, the memory embodying instructions, the instructions being executable by the processor to cause the device to:
receive selection parameters from a first cell, the selection parameters including one or more attributes;
measure the one or more attributes of a plurality of candidate cells based at least in part on the selection parameters received from the first cell, wherein the measured attributes comprise transmission rank and at least one of reference signal receive power or reference signal receive quality;
identify a second cell from the plurality of candidate cells based at least in part on the selection parameters and the one or more measured attributes and without additional direction from the first cell, the first cell being associated with a first base station and the second cell being associated with a second base station, and the first and the second cells being in communication with each other;
determine that an amount of uplink data in a buffer is above a threshold value;
transmit, by the wireless device, an initial access message directly to the second cell to establish an independent connection with the second cell based at least in part on identifying the second cell from the plurality of candidate cells and determine that the amount of uplink data in the buffer is above the threshold;
receive a response message from the second cell without direction from the first cell, wherein the response message is responsive to the initial access message; and
communicate with the first and second cells concurrently using the independent connection with the second cell that is established based at least in part on the receiving the response message from the second cell.

19. The device of claim 18, wherein receiving the selection parameters from the first cell comprises:
receiving a set of candidate cells from which to select the second cell.

20. The device of claim 19, wherein the set of candidate cells comprises cells of a plurality of radio access technologies (RATs), wherein at least one RAT is different than the other RATs.

21. The device of claim 18, wherein a radio access technology (RAT) of the second cell is different from a RAT of the first cell.

22. The device of claim 18, wherein the instructions are further executable by the processor to cause the device to:
receive, from the first cell, a command to establish the independent connection with the second cell, the command including the selection parameters.

23. The device of claim 18, wherein the instructions are further executable by the processor to cause the device to:
determine a parameter associated with each candidate cell in a set of candidate cells; and
select the second cell from the set based at least in part on the parameter associated with the second cell.

24. The device of claim 18, wherein communicating with the first and second cells concurrently comprises:
communicating with the first cell according to a first scheduler associated with the first cell while communicating concurrently with the second cell according to a second scheduler associated with the second cell.

25. An apparatus for wireless communications, comprising:
means for receiving selection parameters from a first cell, the selection parameters including one or more attributes;
means for measuring the one or more attributes of a plurality of candidate cells based at least in part on the selection parameters received from the first cell, wherein the measured attributes comprise transmission rank and at least one of reference signal receive power or reference signal receive quality;
means for identifying a second cell from the plurality of candidate cells based at least in part on the selection parameters and the one or more measured attributes and without additional direction from the first cell, the first cell being associated with a first base station and the second cell being associated with a second base station, and the first and the second cells being in communication with each other;

means for determining that an amount of uplink data in a buffer is above a threshold value;

means for transmitting, by the wireless device, an initial access message directly to the second cell to establish an independent connection with the second cell based at least in part on identifying the second cell from the plurality of candidate cells and determining that the amount of uplink data in the buffer is above the threshold;

means for receiving a response message from the second cell without direction from the first cell, wherein the response message is responsive to the initial access message; and means for communicating with the first and second cells concurrently using the independent connection with the second cell that is established based at least in part on the receiving the response message from the second cell.

26. The apparatus of claim 25, wherein the means for receiving selection parameters from the first cell comprises:

means for receiving a set of candidate cells from which to select the second cell.

27. A non-transitory computer-readable medium storing code for wireless communication, the code comprising instructions executable to:

receive selection parameters from a first cell, the selection parameters including one or more attributes;

measure the one or more attributes of a plurality of candidate cells based at least in part on the selection parameters received from the first cell, wherein the measured attributes comprise transmission rank and at least one of reference signal receive power or reference signal receive quality;

identify a second cell from the plurality of candidate cells based at least in part on the selection parameters and the one or more measured attributes and without additional direction from the first cell, the first cell being associated with a first base station and the second cell being associated with a second base station, and the first and the second cells being in communication with each other;

determine that an amount of uplink data in a buffer is above a threshold value;

transmit, by the wireless device, an initial access message directly to the second cell to establish an independent connection with the second cell based at least in part on identifying the second cell from the plurality of candidate cells and determine that the amount of uplink data in the buffer is above the threshold;

receive a response message from the second cell without direction from the first cell, wherein the response message is responsive to the initial access message; and communicate with the first and second cells concurrently using the independent connection with the second cell that is established based at least in part on the receiving the response message from the second cell.

* * * * *